United States Patent
Walker

(10) Patent No.: US 9,578,072 B2
(45) Date of Patent: Feb. 21, 2017

(54) METHOD AND SYSTEM FOR SYNCHRONISING CONTENT ON A SECOND SCREEN

(71) Applicant: THOMSON LICENSING, Issy de Moulineaux (FR)

(72) Inventor: Mark Leroy Walker, Castaic, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 16 days.

(21) Appl. No.: 14/370,460

(22) PCT Filed: Dec. 27, 2012

(86) PCT No.: PCT/US2012/071824
§ 371 (c)(1),
(2) Date: Jul. 2, 2014

(87) PCT Pub. No.: WO2013/103584
PCT Pub. Date: Jul. 11, 2013

(65) Prior Publication Data
US 2014/0334794 A1 Nov. 13, 2014

Related U.S. Application Data

(60) Provisional application No. 61/584,134, filed on Jan. 6, 2012.

(51) Int. Cl.
*H04N 21/43* (2011.01)
*H04L 29/06* (2006.01)
(Continued)

(52) U.S. Cl.
CPC ........... *H04L 65/403* (2013.01); *G06F 3/1423* (2013.01); *G06F 17/30861* (2013.01);
(Continued)

(58) Field of Classification Search
CPC .................... H04N 21/4307; H04N 21/42204; H04N 21/42224; H04N 9/87
See application file for complete search history.

(56) References Cited

U.S. PATENT DOCUMENTS

2005/0179942 A1* 8/2005 Stavely ................... H04L 69/40
358/1.15
2008/0101454 A1 5/2008 Luff et al.
(Continued)

FOREIGN PATENT DOCUMENTS

CN 102542021 7/2012
EP 2611051 7/2013
(Continued)

OTHER PUBLICATIONS

Howson et al., "Second Screen TV Synchronization," 2011 IEEE International Conference on Consumer Electronics, Berlin, Sep. 8, 2011, pp. 361-365.
(Continued)

*Primary Examiner* — Hung Dang
*Assistant Examiner* — Sunghyoun Park
(74) *Attorney, Agent, or Firm* — Brian J. Dorini; Robert D. Shedd

(57) ABSTRACT

The present disclosure is directed towards a method and system for synching content on a second screen with content being displayed on a first or primary screen. The method and system of the present disclosure supports multiple synching mechanisms as well as prioritization between the different multiple synching mechanism.

14 Claims, 43 Drawing Sheets

(51) Int. Cl.
*G06F 3/14* (2006.01)
*G09G 5/12* (2006.01)
*H04N 21/41* (2011.01)
*H04N 21/422* (2011.01)
*H04N 21/442* (2011.01)
*G06T 11/20* (2006.01)
*H04L 12/26* (2006.01)
*H04N 9/87* (2006.01)
*G06Q 30/02* (2012.01)
*G11B 27/32* (2006.01)
*H04N 21/81* (2011.01)
*G06F 17/30* (2006.01)
*H04N 21/4788* (2011.01)
*H04N 21/845* (2011.01)
*H04N 21/8547* (2011.01)

(52) U.S. Cl.
CPC ........ *G06Q 30/0255* (2013.01); *G06T 11/206* (2013.01); *G09G 5/12* (2013.01); *G11B 27/32* (2013.01); *H04L 43/045* (2013.01); *H04L 43/10* (2013.01); *H04N 9/87* (2013.01); *H04N 21/4122* (2013.01); *H04N 21/4126* (2013.01); *H04N 21/42203* (2013.01); *H04N 21/42204* (2013.01); *H04N 21/42224* (2013.01); *H04N 21/4307* (2013.01); *H04N 21/442* (2013.01); *H04N 21/4788* (2013.01); *H04N 21/8133* (2013.01); *H04N 21/845* (2013.01); *H04N 21/8547* (2013.01); *G06T 2215/16* (2013.01); *G09G 2370/06* (2013.01); *G09G 2370/16* (2013.01)

(56) References Cited

U.S. PATENT DOCUMENTS

| 2010/0218211 | A1* | 8/2010 | Herigstad | H04N 7/163 |
| | | | | 725/34 |
| 2012/0130719 | A1 | 5/2012 | Petrovic et al. | |
| 2012/0151217 | A1 | 6/2012 | Porter et al. | |
| 2012/0170721 | A1* | 7/2012 | Yoakum | H04M 1/7255 |
| | | | | 379/88.11 |
| 2013/0169869 | A1 | 7/2013 | Demoulin et al. | |

FOREIGN PATENT DOCUMENTS

| WO | 2004073217 | 8/2004 |
| WO | WO2009120301 | 10/2009 |
| WO | WO2012092247 | 7/2012 |

OTHER PUBLICATIONS

Jordan, "ABC's Grey's Anatomy Sync for iPad Released," iPad Insight, Feb. 1, 2011, Retrieved from the Internet.

International Search Report Dated Mar. 13, 2013.

Technicolor Anonymous, "Technicolor Launches MediaEcho, a Second Screen App to Enrich Blu-ray, VOD & Broadcast Viewing," Nov. 8, 2011, 2 pages, retrieved from the Internet.

Peng, et al., "An Overview of the Blu-ray Disc Application Format for HD-Movie Distribution", Seventh International Symposium on Optical Storage, Proceedings of SPIE, vol. 5966, Shanghai, China, Apr. 2, 2005.

* cited by examiner

① iPad broadcasts security key using mDNS (UDP socket based communication)

② BD Player authenticates iPad and responds with IP and PORT

③ iPad closes all UDP communication and opens direct TCP socket connection with BD Player ④ Connection has been established for secure two-way communication between iPad and BD Player

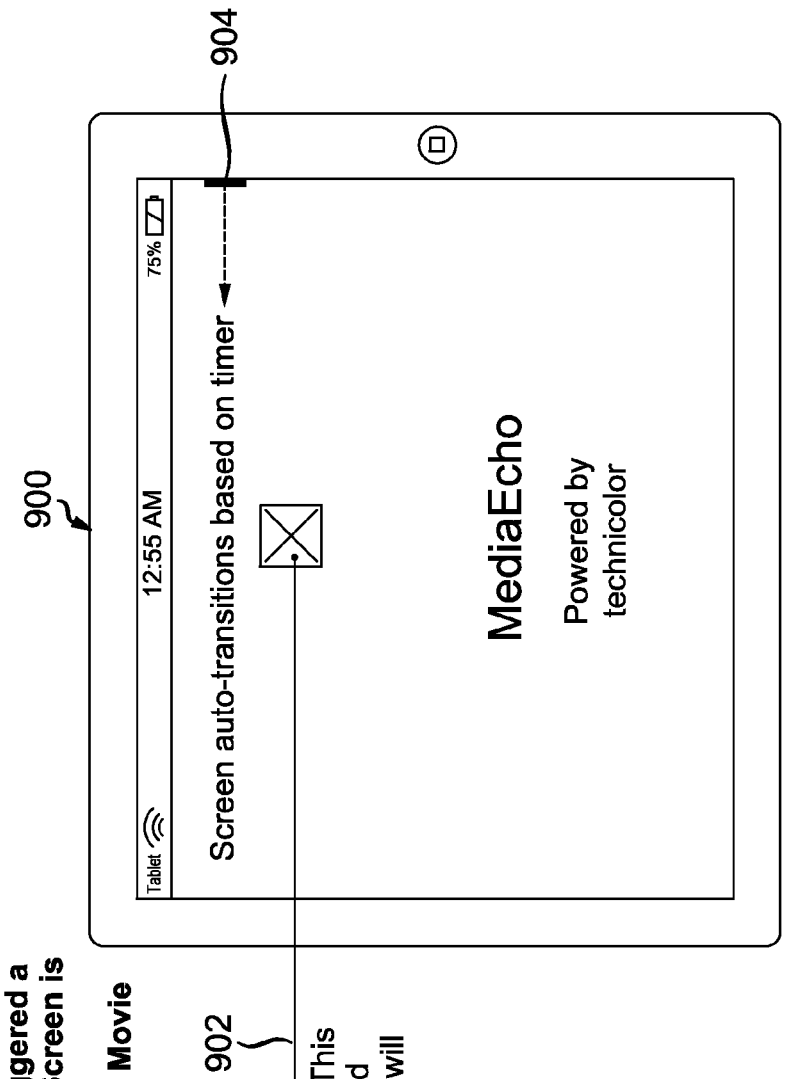

The King's Speech-Timeline (Passive Mode-Default)

The App is in the Passive Mode by default. The passive mode means the Movie Playback and the Event Timeline are in synch and that the Timeline updates automatically. In this mode the App is reacting to event triggers transmitted by the BluRay Player.

Movie Title Leader
Display Movie name. The element is a connected Chapter Bar item that will scroll with the overall Chapter Bar.

Active Chapter Highlight (Movie Playback)
Indicates the chapter that is current playing on First Screen. By default the first chapter displays in center position

Chapter Card
The first card is displayed in the Timeline is a Chapter Card. Each Chapter's Event Set will begin with a Chapter Card Chapter Cards are displayed until the first Content Event is triggered for a given chapter.

Chapter Background/Boundary
There should be a unique background(or each set of chapter events for at least a boundary indicator to separate Event Sets).

Synch Button (in synch)
When the app is in passive mode the Synch Button should display in a state that indicates that Screen 1 & 2 are in synch the synch button should have a slight animation that communicates movement when the app is in the Passive Mode.

Active Chapter (Event Timeline)
Indicates the Chapter that is in locus with regards to the Event displayed in the Event Timeline..

Chapter Number
The Chapter Number associated with the Event in focus in the Event Timeline..

First Content Event
The First Content Event is partially displayed to indicate that there are more events upcoming (passive model) and/or to swipe to (active mode)

Timeline View Icon/Button
Displays selected when the user is in the Timeline View.

FIG. 9C

The King's Speech-Timeline View
(Interaction Mode-Collapsable Chapter Timeline & Control Bar)

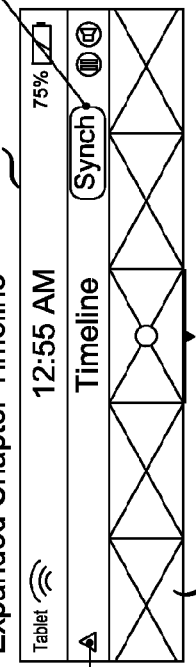

940 — Expanded Chapter Timeline / 910 Timeline / 908

Action:
Tapping Collapse Icon will hide the Chapter Timeline.

908 Action:
Tapping the Synch Button toggles the app between Passive and Active Modes. The button state changes to reflect the post-action state. The state of the Synch Button can also be indirectly affected by user interaction with the Chapter or Events Timelines. (see details later in this document).

908a — Synch    Share — 908b
    Toggles

940 — Collapsed Chapter Timeline / 940b

Action:
Tapping Expand Icon will reveal the Chapter Timeline.

942 Action:
Tapping the Volume On/Off Control Button toggles TV volume between On and Mute.

942a ⟷ 942b
   Toggles

944 Action:
Tapping the TV Play/Pause Button toggles TV playback between Play and Pause

944a ⟷ 944b
   Toggles

*FIG. 9F*

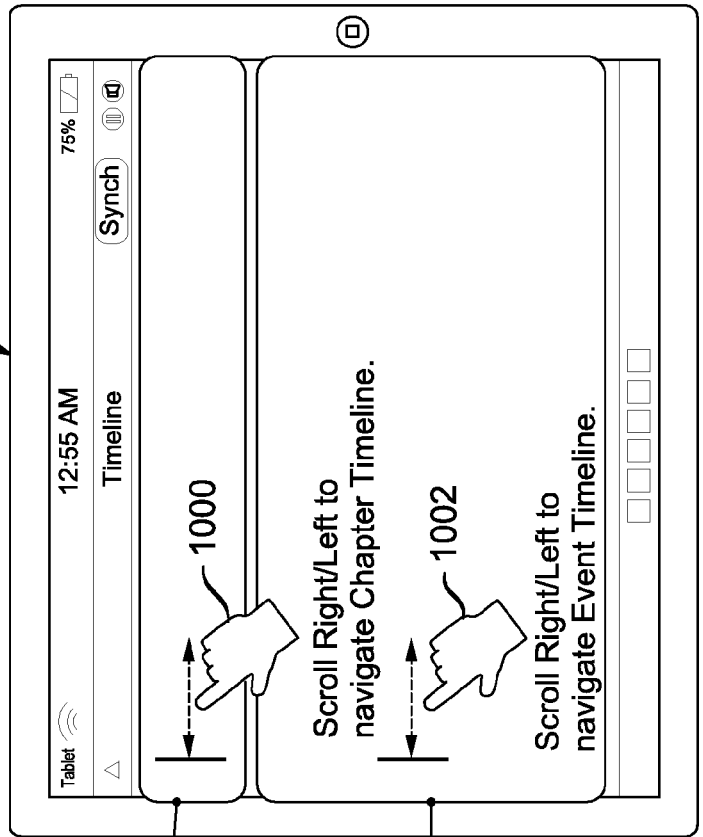

FIG. 10A

The King's Speech-Timeline View (Interactive Mode Chapter and Event Timeline)

The Chapter Timeline and Event Timeline are two independently scrollable panes that function like interdependent gears in which movement (horizontal scrolling) in the other.

Chapter Timeline
Contains the Movie Title Leader and Chapter Thumbnails in the order that reflects the chapter sequence of the corresponding movie. All movie chapter are represented in the timeline.

Event Timeline
Display the sequence of Events for the complete movie. The Events Timeline can be continuously scrolled from the first movie event to the last movie event. Chapter breaks/transistions should be indicated by background changes or audio/visual boundary cues to distinguish Event Sets (collection of events for a given chapter).

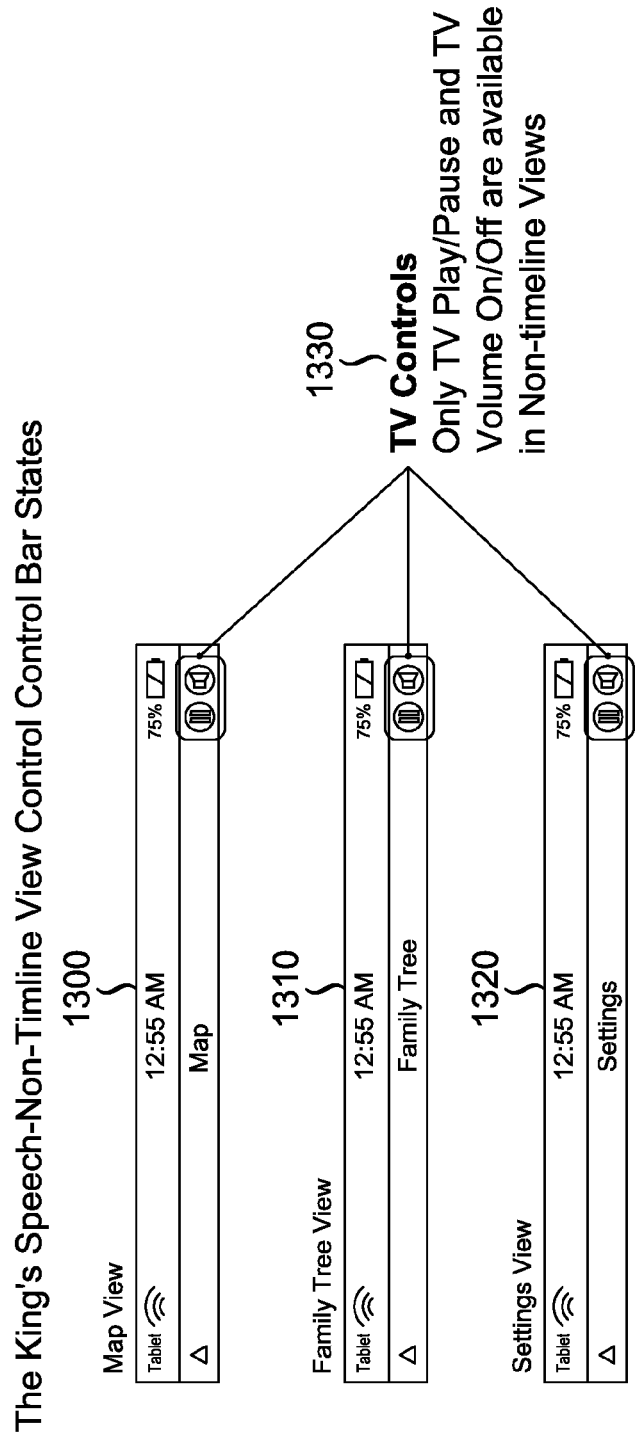

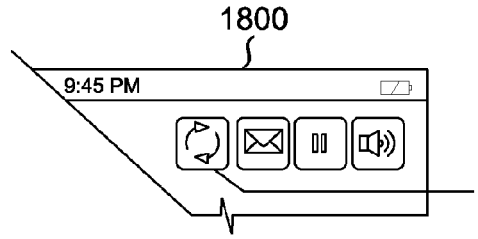

FIG. 18A

Acquiring Sync Indicator — 1810
This is an animated indicator showing that the system is trying to acquire a sync signal from BDLive, metadata source (R&I work) or audio watermarking. If multiple sync sources are available the priority is in the order mentioned above.

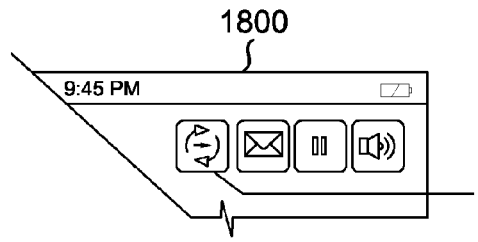

FIG. 18B

Timeline Sync'd Indicator — 1820
Once a sync signal has been acquired the timeline automatically synchronizes to the appropriate event. If the user manually moves the timeline the system changes to "manual" mode and the sync indicator turns into a Sync Button (see below). There are three variants of this indicator to show what method is being used for system sync (BDLive, Metadata, AudioWatermark)

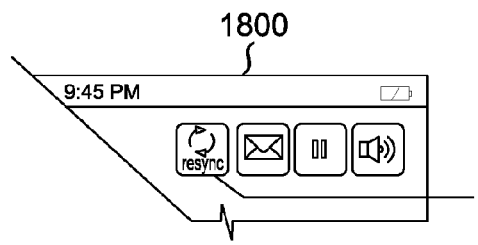

FIG. 18C 1822  1824  1826 icons are illustrative only

Re-sync Button — 1830
When the timeline is not sync'd a button is made available for the user to re-sync the timeline. If there is no user interaction after a period of time (TBD) timeline sync is restored automatically.

1900

Timeline Sync. User options to synchronize the timeline to playback or browse in manual mode.

System Sync is established by connecting to a BDLive source, a metadata (R&I) source or detection of audio watermark. Once system sync is acquired the user can independently cause the timeline events to sync or not.

METHOD AND SYSTEM FOR SYNCHRONISING CONTENT ON A SECOND SCREEN

CROSS REFERENCE TO RELATED APPLICATIONS

This application claims the benefit, under 35 U.S.C. §365 of International Application PCT/US2012/071824, filed Dec. 27, 2012 which was published in accordance with PCT Article 21(2) on Jul. 11, 2013 in English and which claims the benefit of U.S. provisional patent application No. 60/584,134, filed Jan. 6, 2012.

This application is also related to the applications entitled: "METHOD AND SYSTEM FOR PROVIDING A GRAPHICAL REPRESENTATION ON A SECOND SCREEN OF SOCIAL MESSAGES RELATED TO CONTENT ON A FIRST SCREEN", "METHOD AND SYSTEM FOR SYNCHING SOCIAL MESSAGES WITH CONTENT TIMELINE", "METHOD AND SYSTEM FOR PROVIDING A DISPLAY OF SOCIAL MESSAGES ON A SECOND SCREEN WHICH IS SYNCHED WITH CONTENT ON A FIRST SCREEN", "ALTERNATE VIEW PLAYBACK ON A SECOND SCREEN", and "METHOD ANN SYSTEM FOR PROVIDING DYNAMIC ADVERTISING ON SECOND SCREEN BASED ON SOCIAL MESSAGES" which have been filed concurrently and are incorporated by reference herein in their entirety.

BACKGROUND

Technical Field

The present invention generally relates to providing additional content related to displayed content.

Description of Related Art

Traditionally additional content related to a displayed movie or program (such as supplemental materials on a DVD or Blue Ray disc) has to be viewed separately from the main movie or program. That is, the user has to stop or otherwise interrupt the playback of the main movie or program to access the supplemental materials. In many such cases, there is no correlation between the supplemental materials and the main movie or program. In other instances, a picture in picture format is employed to display supplemental materials, but this still interferes with the display and viewing of the main movie or program.

Second screen applications solve many of these problems but introduce some new ones. One such problem is how to synch the content on the second screen to the content on the first screen. Traditionally, the synching is performed by using one of a number of possible methods. One such common method is audio fingerprint detection. With audio fingerprint detect, the audio of the content of the first screen is separately indexed into a database for later look-up. The second screen application samples the audio of the content on the first screen, sends the sample to a service (typically a backend server) and the service returns an identification of the media. One problem with this technique is that is subject to environmental considerations, such as the volume of the audio, ambient noise, and the distance from the speakers of the first screen device to the microphone of the second screen device. Another problem is that not all potential second screen devices may have a microphone, which would prevent using such audio fingerprint detection.

SUMMARY

The present disclosure is directed towards a method and system for synching content on a second screen with content being displayed on a first or primary screen. The method and system of the present disclosure supports multiple synching mechanisms as well as prioritization between the different multiple synching mechanism.

In accordance with one embodiment, a method of synching content on a second screen related to primary content being displayed on first screen is disclosed. The method includes the steps of determining available synching mechanisms for synching content on the second screen to the content on the first screen, selecting a highest priority synching mechanism of the available synching mechanisms, and synching content on the second screen to the primary content displayed on the first screen using the selected highest priority synching mechanism.

In accordance with another embodiment, a second screen device capable of synching content to content on a first screen device is disclosed. The second screen device includes a screen, storage, and a processor. The screen is configured to display content. The storage is for storing data. The processor is configured to determine available synching mechanisms for synching content on the second screen device to content on a first screen device, select a highest priority synching mechanism of the available synching mechanisms, and synch content on the second screen to the content displayed on the first screen using the selected highest priority synching mechanism.

BRIEF DESCRIPTION OF THE DRAWINGS

FIGS. 9A-9F are exemplary skeletal screen views depicting features in accordance with one embodiment when used in passive mode.

FIGS. 10A-10D are exemplary skeletal screen views depicting features in accordance with one embodiment when used in active mode.

FIGS. 13A-13E are exemplary skeletal views depicting additional features in accordance with one embodiment.

FIGS. 14A-14L are exemplary skinned screen views depicting how certain features could appear to a user.

FIGS. 18A-18C are close-up views of a sync indicator showing exemplary icons depicting the status of sync in accordance with one embodiment.

DETAILED DESCRIPTION

Figure 1:
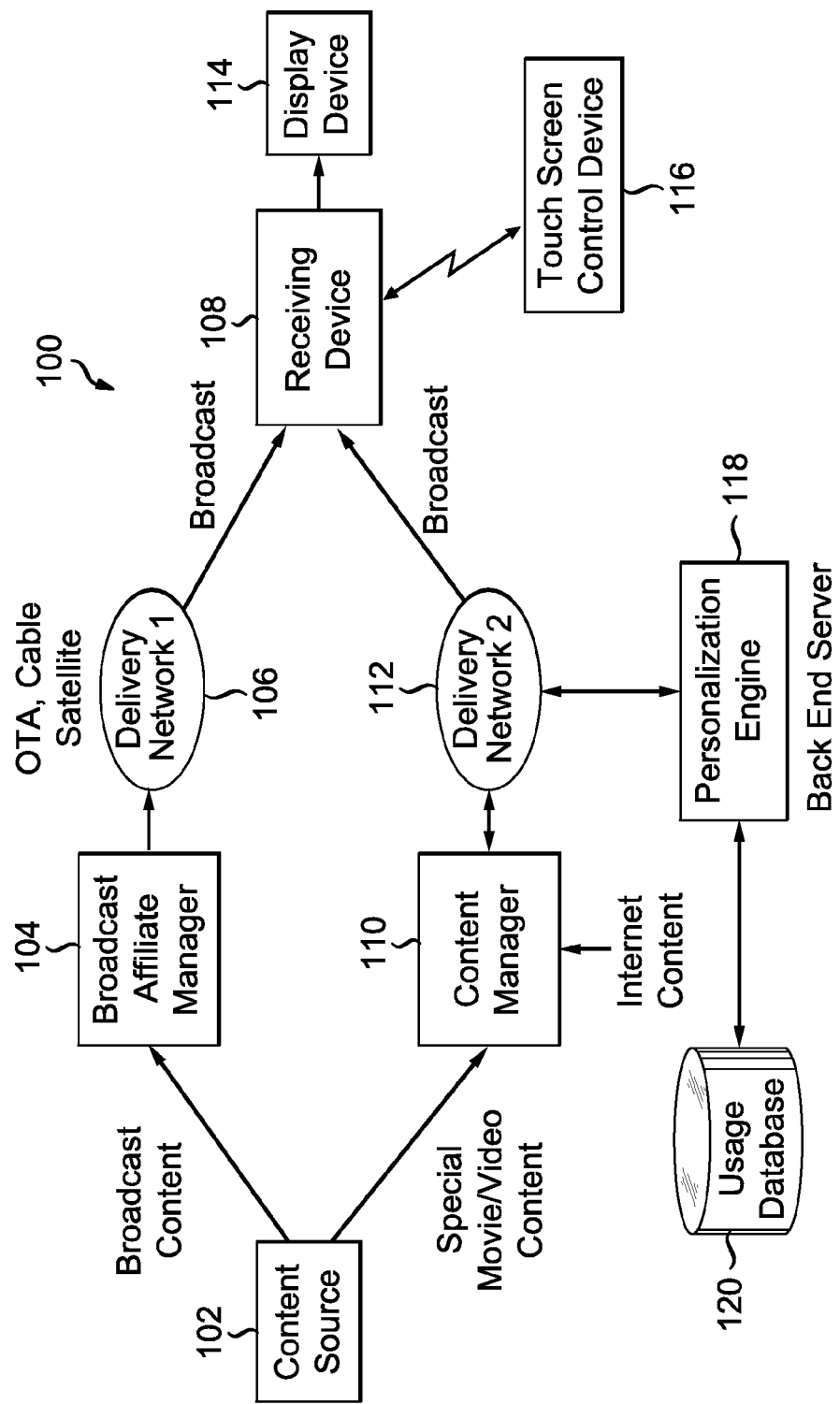
FIG. 1 is a system diagram outlining the delivery of video and audio content to the home in accordance with one embodiment.

Turning now to FIG. 1, a block diagram of an embodiment of a system 100 for delivering content to a home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a receiving device 108 in a user's home, where the content will subsequently be searched by the user. It is to be appreciated that the receiving device 108 can take many forms and may be embodied as a set top box/digital video recorder (DVR), a gateway, a modem, etc. Further, the receiving device 108 may act as entry point, or gateway, for a home network system that includes additional devices configured as either client or peer devices in the home network.

A second form of content is referred to as special or additional content. Special or additional content may include content delivered as premium viewing, pay-per-view, or other content otherwise not provided to the broadcast affiliate manager, e.g., movies, video games or other video elements. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system. The content manager 110 may deliver the content to the user's receiving device 108 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of delivery network 1 (106). In addition, the user may also obtain content directly from the Internet via delivery network 2 (112) without necessarily having the content managed by the content manager 110.

Several adaptations for utilizing the separately delivered additional content may be possible. In one possible approach, the additional content is provided as an augmentation to the broadcast content, providing alternative displays, purchase and merchandising options, enhancement material, etc. In another embodiment, the additional content may completely replace some programming content provided as broadcast content. Finally, the additional content may be completely separate from the broadcast content, and may simply be a media alternative that the user may choose to utilize. For instance, the additional content may be a library of movies that are not yet available as broadcast content.

The receiving device 108 may receive different types of content from one or both of delivery network 1 and delivery network 2. The receiving device 108 processes the content, and provides a separation of the content based on user preferences and commands. The receiving device 108 may also include a storage device, such as a hard drive or optical disk drive, for recording and playing back audio and video content. Further details of the operation of the receiving device 108 and features associated with playing back stored content will be described below in relation to FIG. 2. The processed content is provided to a display device 114. The display device 114 may be a conventional 2-D type display or may alternatively be an advanced 3-D display.

The receiving device 108 may also be interfaced to a second screen such as a touch screen control device 116. The touch screen control device 116 may be adapted to provide user control for the receiving device 108 and/or the display device 114. The touch screen device 116 may also be capable of displaying video content. The video content may be graphics entries, such as user interface entries, or may be a portion of the video content that is delivered to the display device 114. The touch screen control device 116 may interface to receiving device 108 using any well known signal transmission system, such as infra-red (IR) or radio frequency (RF) communications and may include standard protocols such as infra-red data association (IRDA) standard, Wi-Fi, Bluetooth and the like, or any other proprietary protocols. In some embodiments, the touch screen control device 116 can be interfaced directly with delivery networks 1 and 2. Operations of touch screen control device 116 will be described in further detail below.

In the example of FIG. 1, the system 100 also includes a back end server 118 and a usage database 120. The back end server 118 includes a personalization engine that analyzes the usage habits of a user and makes recommendations based on those usage habits. The usage database 120 is where the usage habits for a user are stored. In some cases, the usage database 120 may be part of the back end server 118a. In the present example, the back end server 118 (as well as the usage database 120) is connected to the system the system 100 and accessed through the delivery network 2 (112).

Figure 2:
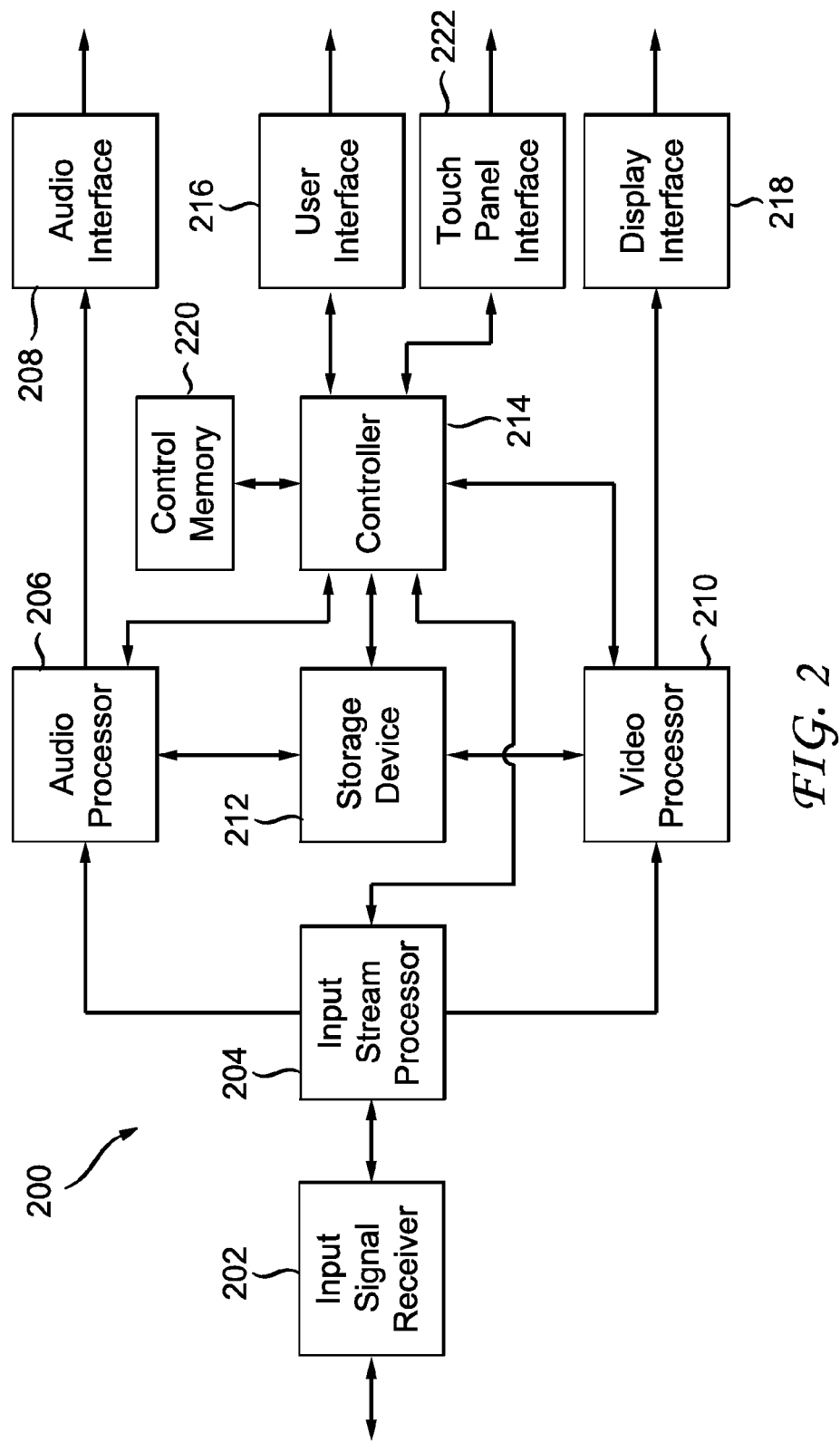
FIG. 2 is system diagram showing further detail of a representative set top box receiver.

Turning now to FIG. 2, a block diagram of an embodiment of a receiving device 200 is shown. Receiving device 200 may operate similar to the receiving device described in FIG. 1 and may be included as part of a gateway device, modem, set-top box, or other similar communications device. The device 200 shown may also be incorporated into other systems including an audio device or a display device. In either case, several components necessary for complete operation of the system are not shown in the interest of conciseness, as they are well known to those skilled in the art.

In the device 200 shown in FIG. 2, the content is received by an input signal receiver 202. The input signal receiver 202 may be one of several known receiver circuits used for receiving, demodulation, and decoding signals provided over one of the several possible networks including over the air, cable, satellite, Ethernet, fiber and phone line networks. The desired input signal may be selected and retrieved by the input signal receiver 202 based on user input provided through a control interface or touch panel interface 222. Touch panel interface 222 may include an interface for a touch screen device. Touch panel interface 222 may also be adapted to interface to a cellular phone, a tablet, a mouse, a high end remote or the like.

The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device or audio amplifier. Alternatively, the audio interface 208 may provide a digital signal to an audio output device or display device using a High-Definition Multimedia Interface (HDMI) cable or alternate audio interface such as via a Sony/Philips Digital Interconnect Format (SPDIF). The audio interface may also include amplifiers for driving one more sets of speakers. The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216 and/or touch panel interface 222. The storage device 212 may be a hard disk drive, one or more large capacity integrated electronic memories, such as static RAM (SRAM), or dynamic RAM (DRAM), or may be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as HDMI. It is to be appreciated that the display interface 218 will generate the various screens for presenting the search results in a three dimensional grid as will be described in more detail below.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 performs searching of content and the creation and adjusting of the grid display representing the content, either stored or to be delivered via the delivery networks, described above.

The controller 214 is further coupled to control memory 220 (e.g., volatile or nonvolatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 may store instructions for controller 214. Control memory may also store a database of elements, such as graphic elements containing content. The database may be stored as a pattern of graphic elements. Alternatively, the memory may store the graphic elements in identified or grouped memory locations and use an access or location table to identify the memory locations for the various portions of information related to the graphic elements. Additional details related to the storage of the graphic elements will be described below. Further, the implementation of the control memory 220 may include several possible embodiments, such as a single memory device or, alternatively, more than one memory circuit communicatively connected or coupled together to form a shared or common memory. Still further, the memory may be included with other circuitry, such as portions of bus communications circuitry, in a larger circuit.

Figure 3:
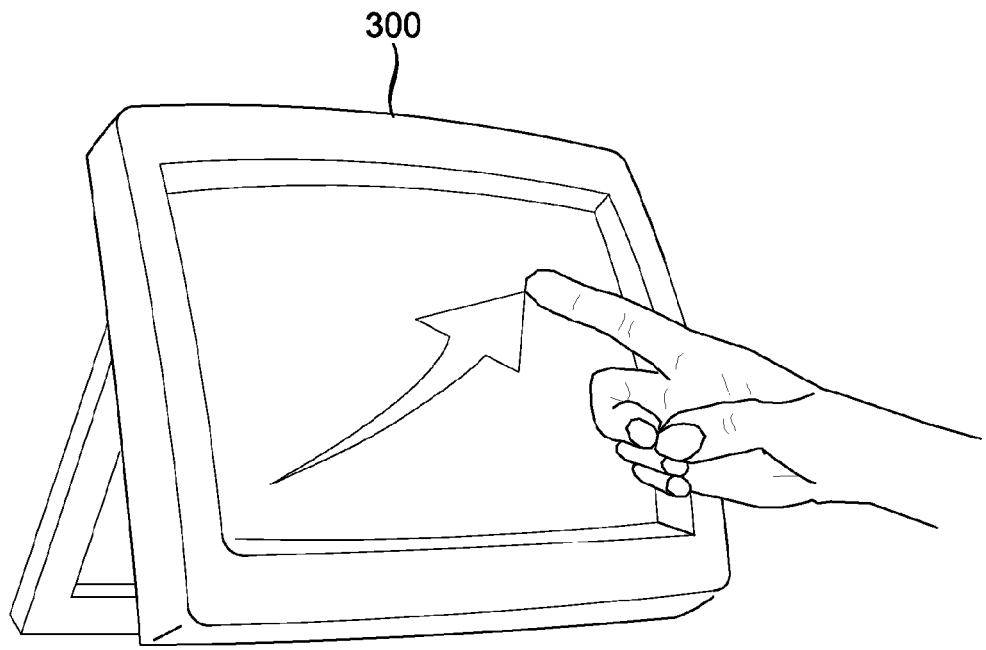
FIG. 3 is a diagram depicting a touch panel control device in accordance with one embodiment.

The user interface process of the present disclosure employs an input device that can be used to express functions, such as fast forward, rewind, etc. To allow for this, a touch panel device 300 may be interfaced via the user interface 216 and/or touch panel interface 222 of the receiving device 200, as shown in FIG. 3. The touch panel device 300 allows operation of the receiving device or set top box based on hand movements, or gestures, and actions translated through the panel into commands for the set top box or other control device. In one embodiment, the touch panel 300 may simply serve as a navigational tool to navigate the grid display. In other embodiments, the touch panel 300 will additionally serve as the display device allowing the user to more directly interact with the navigation through the grid display of content. The touch panel device may be included as part of a remote control device containing more conventional control functions such as actuator or activator buttons. The touch panel 300 can also includes at least one camera element. In some embodiments, the touch panel 300 may also include a microphone.

Figure 4:
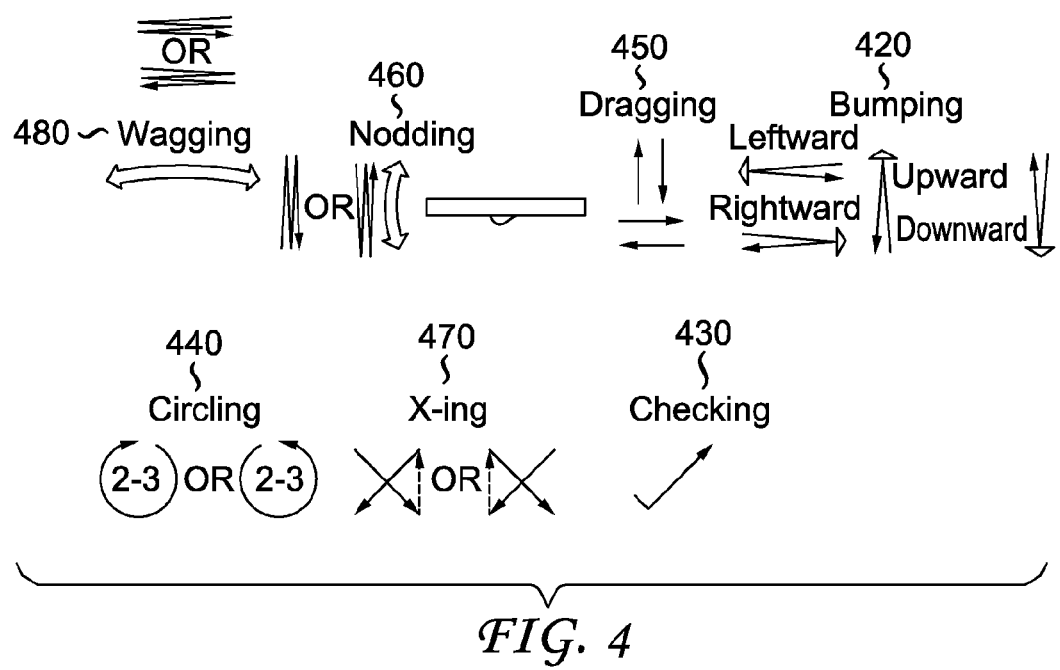
FIG. 4 is a diagram depicting some exemplary user interactions for use with a touch panel control device in accordance with one embodiment.

Turning now to FIG. 4, the use of a gesture sensing controller or touch screen, such as shown, provides for a number of types of user interaction. The inputs from the controller are used to define gestures and the gestures, in turn, define specific contextual commands. The configuration of the sensors may permit defining movement of a user's fingers on a touch screen or may even permit defining the movement of the controller itself in either one dimension or two dimensions. Two-dimensional motion, such as a diagonal, and a combination of yaw, pitch and roll can be used to define any three-dimensional motion, such as a swing. A number of gestures are illustrated in FIG. 4. Gestures are interpreted in context and are identified by defined movements made by the user.

Bumping 420 is defined by a two-stroke drawing indicating pointing in one direction, either up, down, left or right. The bumping gesture is associated with specific commands in context. For example, in a TimeShifting mode, a left-bump gesture 420 indicates rewinding, and a right-bump gesture indicates fast-forwarding. In other contexts, a bump gesture 420 is interpreted to increment a particular value in the direction designated by the bump. Checking 440 is defined as in drawing a checkmark. It is similar to a downward bump gesture 420. Checking is identified in context to designate a reminder, user tag or to select an item or element. Circling 440 is defined as drawing a circle in either direction. It is possible that both directions could be distinguished. However, to avoid confusion, a circle is identified as a single command regardless of direction. Dragging 450 is defined as an angular movement of the controller (a change in pitch and/or yaw) while pressing a button (virtual or physical) on the tablet 300 (i.e., a "trigger drag"). The dragging gesture 450 may be used for navigation, speed, distance, time-shifting, rewinding, and forwarding. Dragging 450 can be used to move a cursor, a virtual cursor, or a change of state, such as highlighting outlining or selecting on the display. Dragging 450 can be in any direction and is generally used to navigate in two dimensions. However, in certain interfaces, it is preferred to modify the response to the dragging command. For example, in some interfaces, operation in one dimension or direction is favored with respect to other dimensions or directions depending upon the position of the virtual cursor or the direction of movement. Nodding 460 is defined by two fast trigger-drag up-and-down vertical movements. Nodding 460 is used to indicate "Yes" or "Accept." X-ing 470 is defined as in drawing the letter "X." X-ing 470 is used for "Delete" or "Block" commands. Wagging 480 is defined by two trigger-drag fast back-and-forth horizontal movements. The wagging gesture 480 is used to indicate "No" or "Cancel."

Depending on the complexity of the sensor system, only simple one dimensional motions or gestures may be allowed. For instance, a simple right or left movement on the sensor as shown here may produce a fast forward or rewind function. In addition, multiple sensors could be included and placed at different locations on the touch screen. For instance, a horizontal sensor for left and right movement may be placed in one spot and used for volume up/down, while a vertical sensor for up and down movement may be place in a different spot and used for channel up/down. In this way specific gesture mappings may be used.

The system and methodology can be implemented in any number of ways depending on the hardware and the content involved. Examples of such deployment include DVD, Blu-Ray disc (BD); streaming video or video on demand (VOD), and broadcast (satellite, cable, over the air). Each of these deployments would have different architectures but one could standardize the triggers for each of these events (the additional content) that represents what would be queued by the application running on the second screen. For example, event A and event B would be triggered by a synching mechanism associated with any of these sources of a video. When the tablet encounters "event A", the program running on the second screen device (e.g. tablet) will enact "event A". Similarly, if "event B" is encountered, the program running on the second screen device would do "event B".

Figure 5:
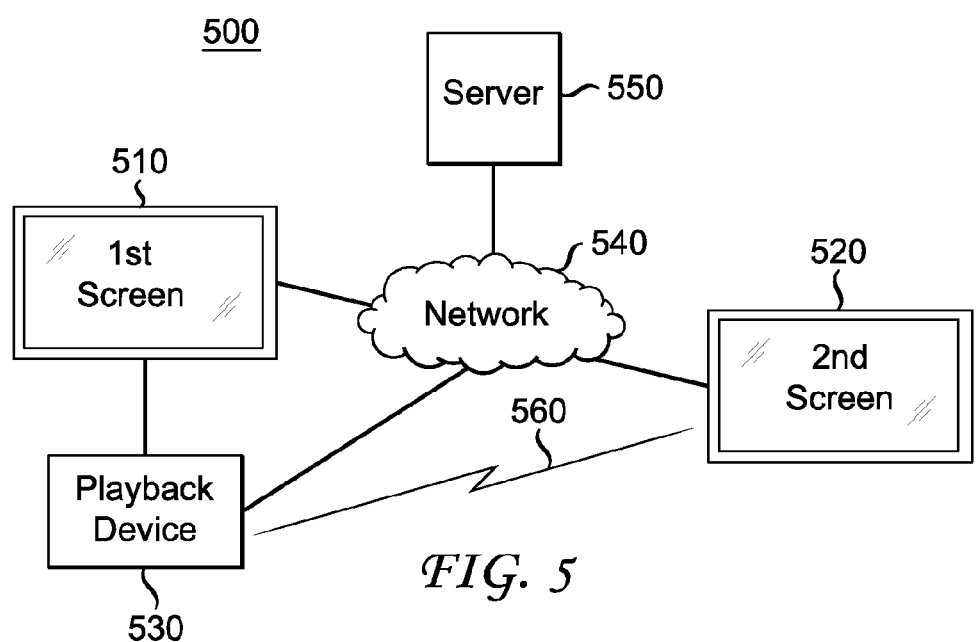
FIG. 5 is system diagram depicting one embodiment of a system for implementing techniques of the present invention in accordance with one embodiment.

FIG. 5 depicts a generic system 500 on which such methodology could be implemented. Here the system 500 includes a first screen device 510, a second screen device 520, a playback device 530, a network 540 and server 550. Each of these elements will be discussed in more detail below.

The first screen device 510 is a display device, such as display device 114 described above in relation to FIG. 1, for displaying content such as television programs, movies, and websites. Examples of such first screen display devices include, but are not limited to, a television, monitor, projector, or the like. The first screen device 510 is connected to the playback device 530 which can provide the primary content to the first screen device 510 for display. Examples of such communication include, but are not limited to HDMI, VGA, Display port, USB, component, composite, radio frequency (RF), and infrared (IR), and the like. In certain embodiments, the first screen display device 510 may be connected to the network 540, in either a wired or wireless (WiFi) manner, providing additional connection to the second screen device 520 and server 550. In some embodiments, the first display device 510 may include the functionality of the playback device 530. In still other embodiments, the first screen display device 510 may be in non-networked communication 560 with the second screen device 520. Examples of such non-networked communication 560 include, but are not limited to, RF, IR, Blue-Tooth, and other audio communication techniques and protocols.

The second screen device 520 is device capable of displaying additional content related to the primary content being displayed on the first screen device 510. The second screen device may be a touch screen control device 116 or touch screen device 300 as described above. Examples of second screen devices include, but are not limited to, a smart phone, tablet, laptop, personal media player (e.g. ipod), or the like. The second screen device 520 is in communication with playback device 530 using either network 540, non-networked communication 560, or both. The second screen device 550 is also in communication with the server 550 via the network 540 for requesting and receiving additional content related to the primary content being displayed on the first screen device 510. In some embodiments, the second screen device 520 may be in networked or non-networked communication 560 with the first screen device 510. Examples of such non-networked communication 560 include, but are not limited to, RF, IR, Blue-Tooth (BT), audio communication techniques and protocols, or the like.

The playback device 530 is device capable of providing primary content for display on the first screen device 510. Examples of such playback display devices include, but are not limited to, a DVD player, Blue-Ray Disc (BD) player, game console, receiver device (cable or satellite), Digital Video Recorder (DVR), streaming device, personal computer, or the like. The playback device 530 is connected to the first screen device 510 for providing the primary content to the first screen device 510 for display. Examples of such connections include, but are not limited to HDMI, VGA, Display port, USB, component, composite, radio frequency (RF), and infrared (IR), and the like. The playback device 530 is also connected to the network 540, in either a wired or wireless (WiFi) manner, providing connection to the second screen device 520 and server 550. In some embodiments, the functionality of the playback device 530 may be included in the first screen display device 510. In still other embodiments, the playback device 530 may be in non-networked communication 560 with the second screen device 520. Examples of such non-networked communication 560 include, but are not limited to, RF, IR, Blue-Tooth (BT), and other audio communication techniques and protocols.

The network 540 can be a wired or wireless communication network implemented using Ethernet, MoCA, and wireless protocols or a combination thereof. Examples of such a network include, but are not limited to, delivery network 1 (106) and delivery network 2 (112) discussed above.

The server 550 is a content server configured to provide additional content to the second screen device 520. In certain embodiments, the server may also provide the primary content for display on the first screen device 510. The service is connected to the network 540 and can communicate with any of the devices that are also connected. Examples of such a server include, but are not limited to, content source 102, broadcast affiliate manager 104, content manager 110, and the back end server described above.

Figure 6:
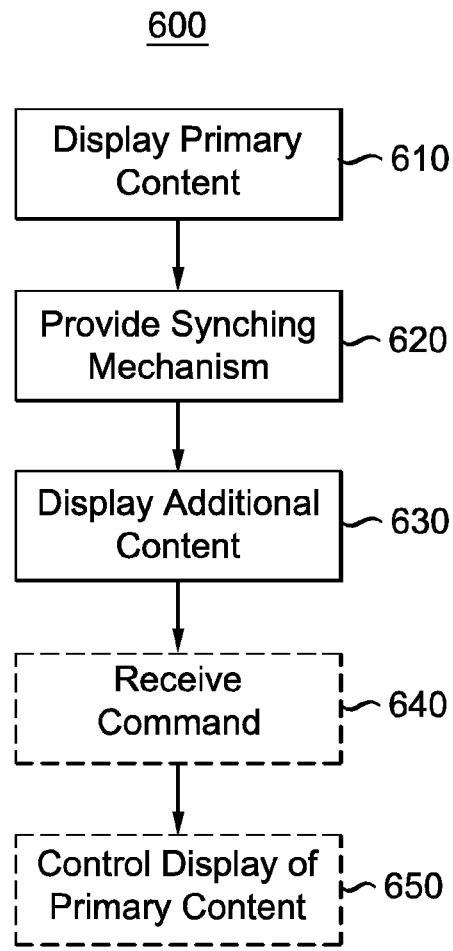
FIG. 6 is a flow diagram depicting an exemplary process in accordance with one embodiment.

FIG. 6 depicts a flow diagram 600 for a methodology for displaying additional content related to primary content being viewed is disclosed. The method includes the following steps: Displaying primary content on a first screen device 510 (step 610). Providing, in association with the display of the primary content on the first screen, a synching mechanism to synch additional content (step 620). Displaying, on a second screen device 520, additional content related to the primary content on the first screen 510 that is synched to the content displayed on the first screen device according to the synching mechanism (step 630). In certain embodiments, the method also includes the steps of receiving commands from the second screen device 520 to control the display of primary content on the first screen device 510 (step 640) and controlling the display of the primary content on the first screen device 510 based on the commands received from the second screen device 520 (step 650). Each of these steps will be described in more detail below.

The step of displaying primary content (step 610), such as a movie or television show, is performed on the first screen device 510. This involves the primary content being provided to the first screen display 510. The primary content can be provided by the playback device 530 or be received directly from a content provider at the first screen display device 510. The primary content is then shown or otherwise displayed on the first screen device 510. The display of the primary content also includes the control of the content being displayed. This can include the traditional playback commands of play, stop, pause, rewind, and fast forward as well as the navigation of on screen menus to select the content and other playback options. In certain embodiments, the display on the first screen device 510 (step 620) further includes displaying an indicator of the type of additional content being displayed on the second screen device 520.

The provided synching mechanism (step 620) can be implemented in a number of ways. In certain embodiments the synching mechanism is performed by an application running on the second screen device 520, the playback mechanism 530, the first screen device 510 or any combination thereof. At its most basic, the second screen device 520 is configured (via an application) to detect synching signals, cues, or other type of indicators that directs the second screen device 520 to update the display of additional content to coincide with the primary content being displayed on the first screen 510. The synching signals, cues or other type of indicators, can be provided as part of the primary content or can be generated by the playback device 530 of first screen device 510 (via an application) in accordance with the chapter, scene, time-code, subject matter, or content being displayed. The synching signals, cues or other type of indicators can be transmitted to the second screen device 520 using the network, in either a wired or wireless (WiFi) manner, or using non-networked communication 560 such as audio signals. Examples of some of the implementations are given below. Other possible implementations will be apparent given the benefit of this disclosure.

The step of displaying the additional content, such as supplemental materials, video clips, websites, and the like (step 630) is performed on the second screen device 520. The additional content can be stored locally on the second screen device 520 or be provided by the server 550, playback device 530, or first screen device 510. The display of the additional content is synched to the primary content being displayed on the first screen device 510 according to the synching mechanism. For example, when the second screen device 520 detects a synching signal, cue or other type of indicator, the second screen device 520 updates the display of the additional content accordingly. In some embodiments, this further involves contacting and requesting the additional content from the server 550, playback device 530, or first screen device 510 and subsequently downloading and displaying the additional content. In some embodiments, the additional content to be displayed can be selected, modified, or omitted based on the user using the system.

In certain embodiments, the display on the second screen device 520 (step 630) further includes displaying the status of the display of the primary content on the first screen device 510 such as whether the display of the primary content on the first screen device 510 has been paused. In certain other embodiments, the display on the second screen device 520 (step 630) further includes displaying the status of the synch between the additional content on the second screen device 520 and the primary content on the first screen device 510.

In certain embodiments, the second screen device 520 is capable of transmitting as well as receiving. The optional steps 640 and 650 address this capability. In step 640 commands are received from the second screen device 520. Ideally, these commands are received at the device controlling the playback of the primary content on the first screen device 510. In certain embodiment, the playback device 530 is the device receiving the commands. The commands can be sent via the network 540 or non-networked communication 560. Once received, the commands can control the display of the primary content (step 650). Examples of such control include, but are not limited to, play, stop, pause, rewind, fast-forward, as well as chapter, scene, and selection. These commands can also be used to synch the primary content displayed on the first screen device 510 with the additional content being displayed on the second screen device 520.

Figure 7:
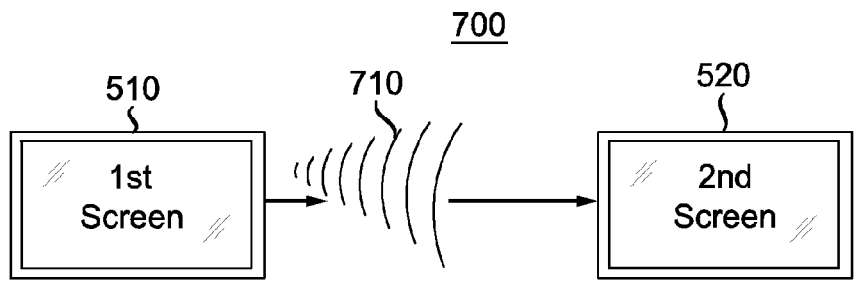
FIG. 7 is a diagram depicting an exemplary methodology of synching between devices in accordance with one embodiment.

FIG. 7 provides a high level overview of one example of system 700 with a synching mechanism implemented using a non-networked communication 560. In this system 700, the non-networked communication synching mechanism is audio watermarking 710. In this example, audio watermarking 710 involves inserting a high-frequency signal, cue, or other indicator into the audio signal of the primary content being displayed on the first screen device 510. The audio watermark is inaudible to humans but can be detected by a microphone in the second screen device 520. When the second screen device 520 detects an audio watermark, the displayed additional content is updated to synch with the primary content being displayed on the first screen device 510 based on the detected watermark. The audio watermarks can be incorporated into the primary content at the source of the content or inserted locally by the playback device 520 or first screen device 510.

Figure 8:
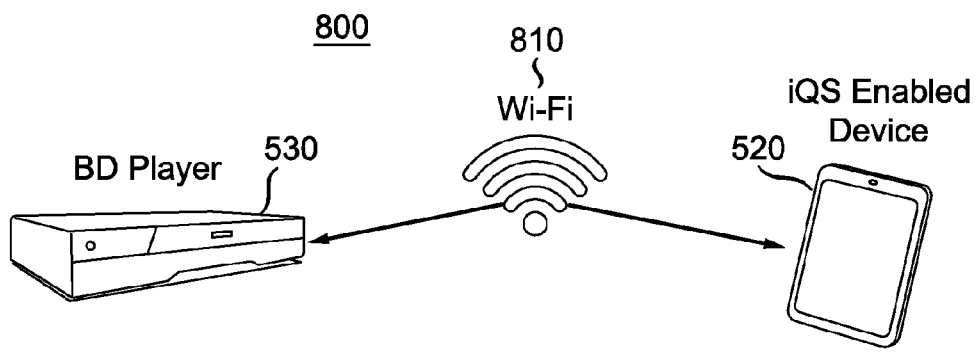
FIG. 8 is a diagram depicting an exemplary methodology of synching between devices in accordance with one embodiment.

FIG. 8 provides a high-level overview of one example of a system 800 with a synching mechanism implemented using the network 540. In this system 800 the synching mechanism is wireless communication (WiFi) 810 between a playback device 530 (a Blu-Ray Disc player) and the second screen device 520 (an iOS device running an application). In the example of FIG. 7, the features and protocols of a BD-Live enabled device are used. There are two main components of this protocol: connection and communication. Both are described below. For simplicity the second screen iOS application will be referred to as the "iPad" and the BD-Live enabled device will be referred to as the "disc".

Connection occurs when an iOS enabled device 520 first launches the second screen application and attempts to connect to a BD-Live enabled device 530 on the same Wi-Fi network 540.
1. Disc is inserted into BD player
2. Disc enters UDP 'listening' loop
3. iPad launches second screen application
4. iPad performs UDP broadcast of authentication token
5. Disc receives authentication token and authenticates
6. Disc retrieves IP from tokens sender (iPad's IP)
7. Disc responds to authentication with its IP and PORT
8. iPad confirms IP and PORT
9. iPad closes UDP socket communication
10. iPad establishes direct TCP socket communication with disc based on IP and PORT provided.

Communication occurs after a connection has been established between the second screen iOS application and a BD-Live enabled device.
1. iPad and Disc are aware of each other's IP's as well as what PORT communication should occur using
2. TCP socket communication is maintained for the duration of the applications lifecycle.

One advantage of such a wireless communication as seen in this example is that it is bi-directional allowing the second screen device to transmit as well as receive commands. This allows for two way synching as well as control of playback from the second screen device 520.

In certain embodiments, the application of the second screen device 520 could be specific to a specific program or movie on a specific system (e.g. BD). In other embodiments, the second screen application could be generic to a studio with available plug-ins to configure the application to a particular program or movie. In still other embodiments the second screen application could be universal to system (BD, VOD, broadcast), content, or both. Other possible implementations and configurations will be apparent to one skilled in the art given the benefit of this disclosure.

The system can be operated in with a passive approach or an interactive approach. In the passive approach icons displayed on first screen device 510 prompt the user to look at the second screen device 520 for an additional content event being displayed that is related to the primary content displayed on the first screen device 510. The icon preferably indicates what type of additional content event is available on the second screen device 520 (e.g., a shopping cart icon indicates a purchase event, an "I" icon indicates an information event, a stickman icon indicates a character information event, etc.) FIG. 9A-F depicts some of the aspects that may be displayed to the user in passive mode.

FIGS. 9A-F depict skeletal examples of what may be displayed on the screen 900 of the second screen device to a user when using an application in passive mode that provides additional content on the second screen device 520 that is synched with the primary content on the first screen device 510.

FIG. 9A depicts a splash screen that may be displayed to the user when the application is launched. It includes the product logo and indication of the primary content 902. Here new content screens transition in from right in a conveyor-belt like manner as indicate by arrow 904.

Figure 9B:
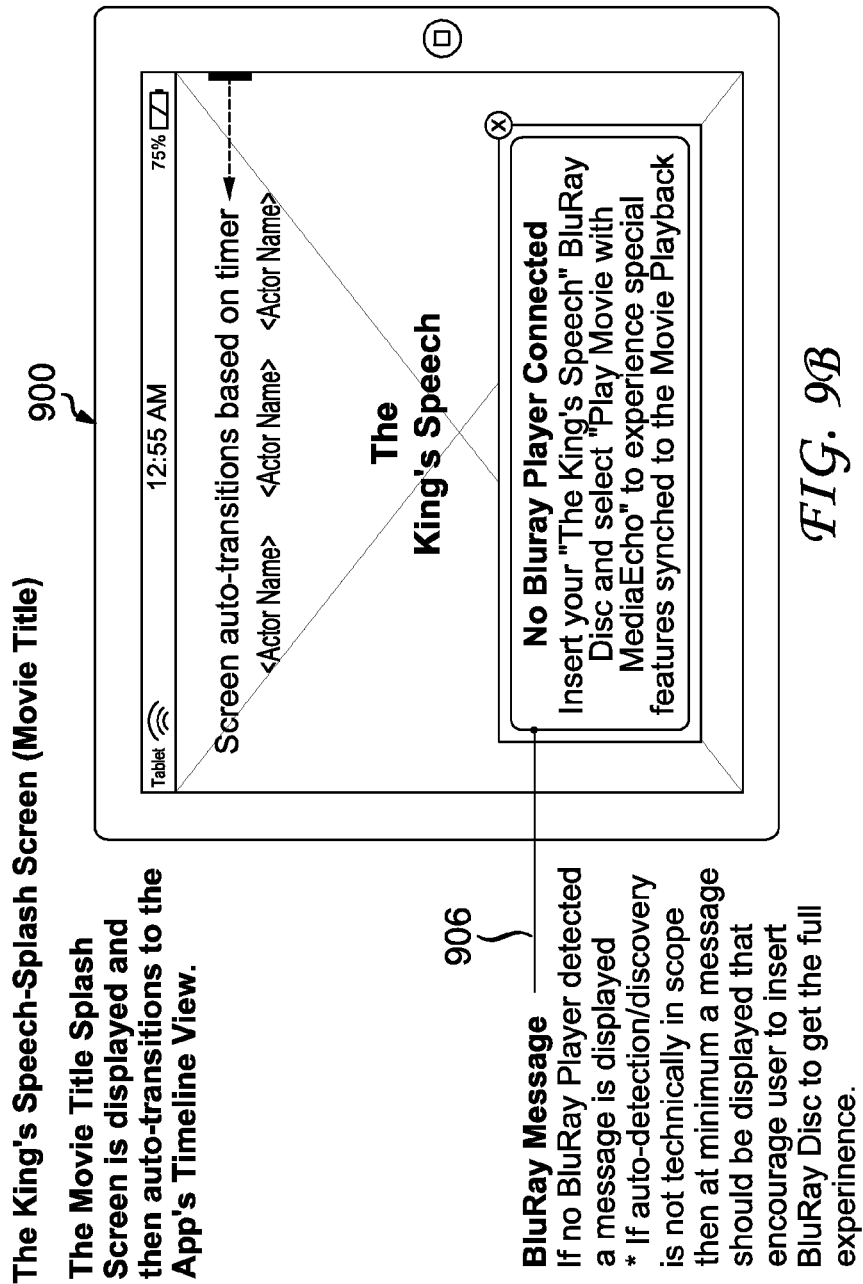

FIG. 9B depicts a pop-up message 906 that is displayed to a user when no playback device 530 is detected by second screen device 520.

The screen 900 of FIG. 9C shows a synch button/icon 908, chapter timeline 910, active chapter indicator 912, chapter-event indicator 914, chapter number indicator 916, event timeline 918, chapter background 920, event card 922, and timeline view icons 924. The synch button 908 provides a mechanism to synch the content between the first and second screen devices 510, 520. The synch button 908 may also indicate the status of the synch between the content on the first and second screen devices 510, 520. The chapter timeline 910 indicates the chapters of the primary content. The movie title leader is in the background of the chapter timeline 910 and indicates the primary content. As the primary content progresses the chapters move along chapter timeline in a conveyor-belt life fashion with the active chapter indicator 912 indicating the current chapter in the primary content via highlight and center position of the chapter timeline 912. The chapter-event indicator 914 indicates that events displayed in the event timeline 918 are part of the active chapter shown in the chapter timeline 910. The event timeline 918 displays event cards 922 indicating events that correspond to what is transpiring in the current chapter of the primary content. For each chapter, the first displayed event card 922 indicates the chapter that the following events occur in. As the primary content progresses the event cards 922 move along event timeline 918 in a conveyor-belt like fashion with the current event in the center position of the event timeline 918. Each chapter may be provided with a unique background 920 for the events of that particular chapter. The timeline view icon/button 924 indicates that the viewer is in timeline view showing the chapter timeline 910 and event timeline 918 as well as provides a mechanism to access the timeline view.

Figure 9D:
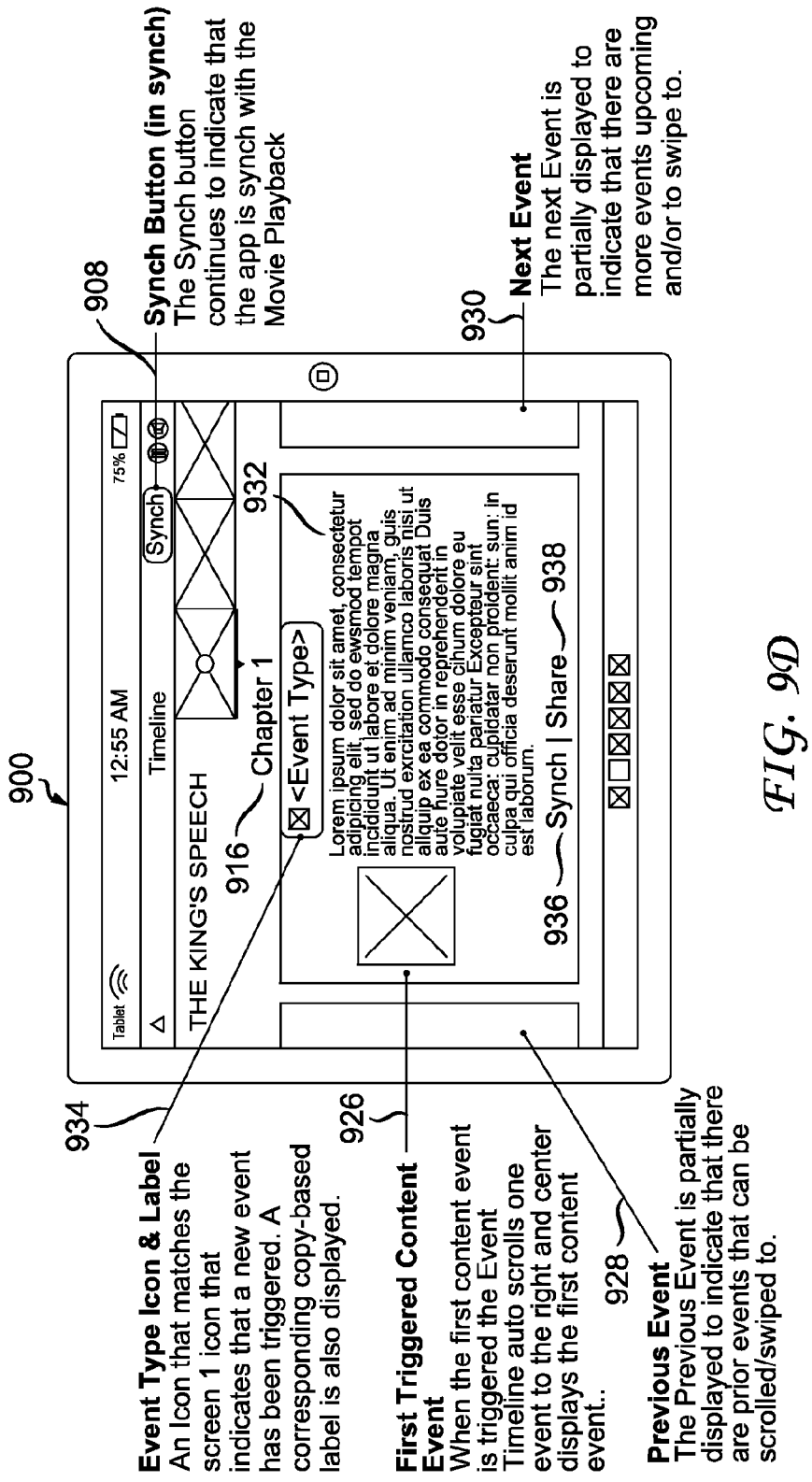
Figure 9E:
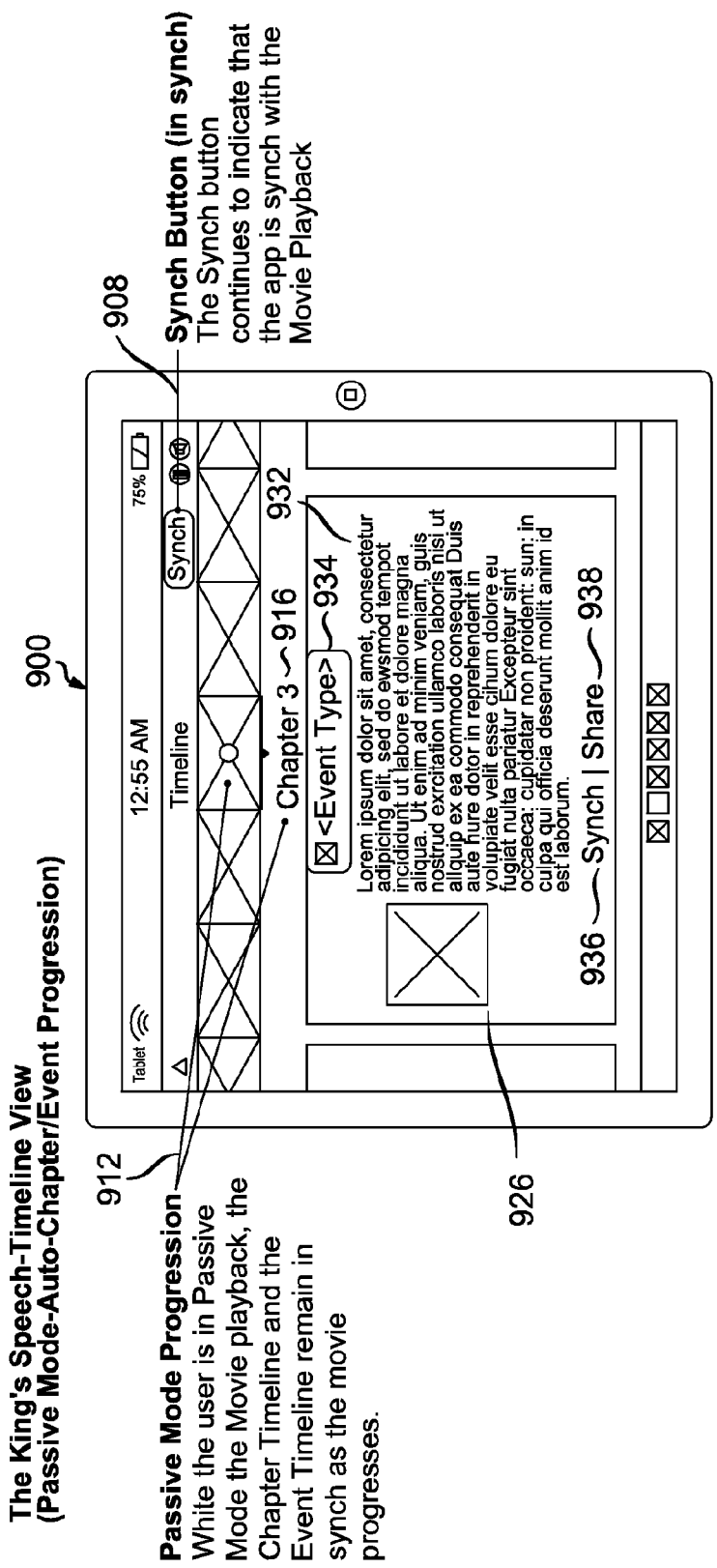

The screens 900 of FIGS. 9D and 9E depict how event cards 922 progress across the event timeline 918. Here the synch button/icon 908 indicates that the timeline view of the additional content is in synch with the primary content on the first screen device 510. In FIG. 9D, the current triggered event card 926 is shown in the center position of the event timeline 918 and represents the first triggered event. To the left of the current triggered event card 926 in the event timeline 918 is the previous event card 928, in this case the card indicating the chapter. To the right of the current triggered event card 926 in the event timeline 918 is the next event card 930, in this case the card indicating the next scheduled event. Since, in FIG. 9D, this is the current triggered event card 926 is for the first triggered event, the chapter indicator 916 indicates that it is chapter 1. The current triggered event card 926 includes the additional content 932 related to the primary content. The current triggered event card 926 also provides an indicator 934 as to what type of additional content is displayed. In certain embodiments this indicator matches an indicator shown on the first screen display 510. The current event card 926 also includes buttons/icons for synching 936 and sharing 938. The synch button/icon 936 provides a mechanism that causes the primary content displayed on the first screen device 520 to be synched with the current event. The share button/icon 938 provides a mechanism to share the additional content of the event with a social network. The elements of the screen 900 of FIG. 9E are similar to the elements of FIG. 9D except that the current triggered event card 926 is for an event that happens later in the timeline as indicated by the chapter indicator 916 which indicates the current chapter is chapter 3.

FIG. 9F depicts examples of other possible functionality that may be provided as part of display on the second screen device 920. Here the chapter timeline 910 is provided with a collapse icon/button 940 which provides a mechanism to toggle the chapter timeline between visible 940a and hidden 940b. Likewise the synch button/icon 908 can toggle between status indicating whether synch is currently active 908a and status indicating synch has been lost and re-synching is available 908b. In some embodiments a volume button icon 942 is provided. The volume button/icon 942 provides a mechanism to turn the sound of the first screen display "OFF" or "ON". The volume button 942 may also indicate the status of whether the volume is "ON" indicating muting is available 942a, or "OFF" indicating sound is available 942b. In some other embodiments a play/pause button/icon 944 is provided. The play/pause button 944 provides a mechanism to pause or resume playback of content on the first screen display 510. The pause/play button may also indicate the status of whether the playback can be paused 944a, or "or resumed 944b.

In the interactive approach, the user selects an additional content event on the second screen device 520 and what is displayed on the primary screen device 510 is synched to the selected event. As indicated previously, the events of additional content are synched to the primary content. If the user swipes the movie timeline or the events, the events become out of synch with the movie being shown on the main screen. To re-synch touches the synch button on the tablet. The timeline or events are the synched back to what is being displayed on the main screen. Likewise, a user can select a trivia event or map event, touch the synch button, and the scene in the movie related to the selected trivia or map event will be played on the main screen. Examples of this can be seen in FIG. 10A-D.

FIG. 10A depicts how a user may interact with the chapter timeline 910 and event timeline 918 on the screen 900. Here icons 1000 and 1002 represent how the user can touch the screen to scroll left or right in the chapter or event timelines 910, 918.

Figure 10B:
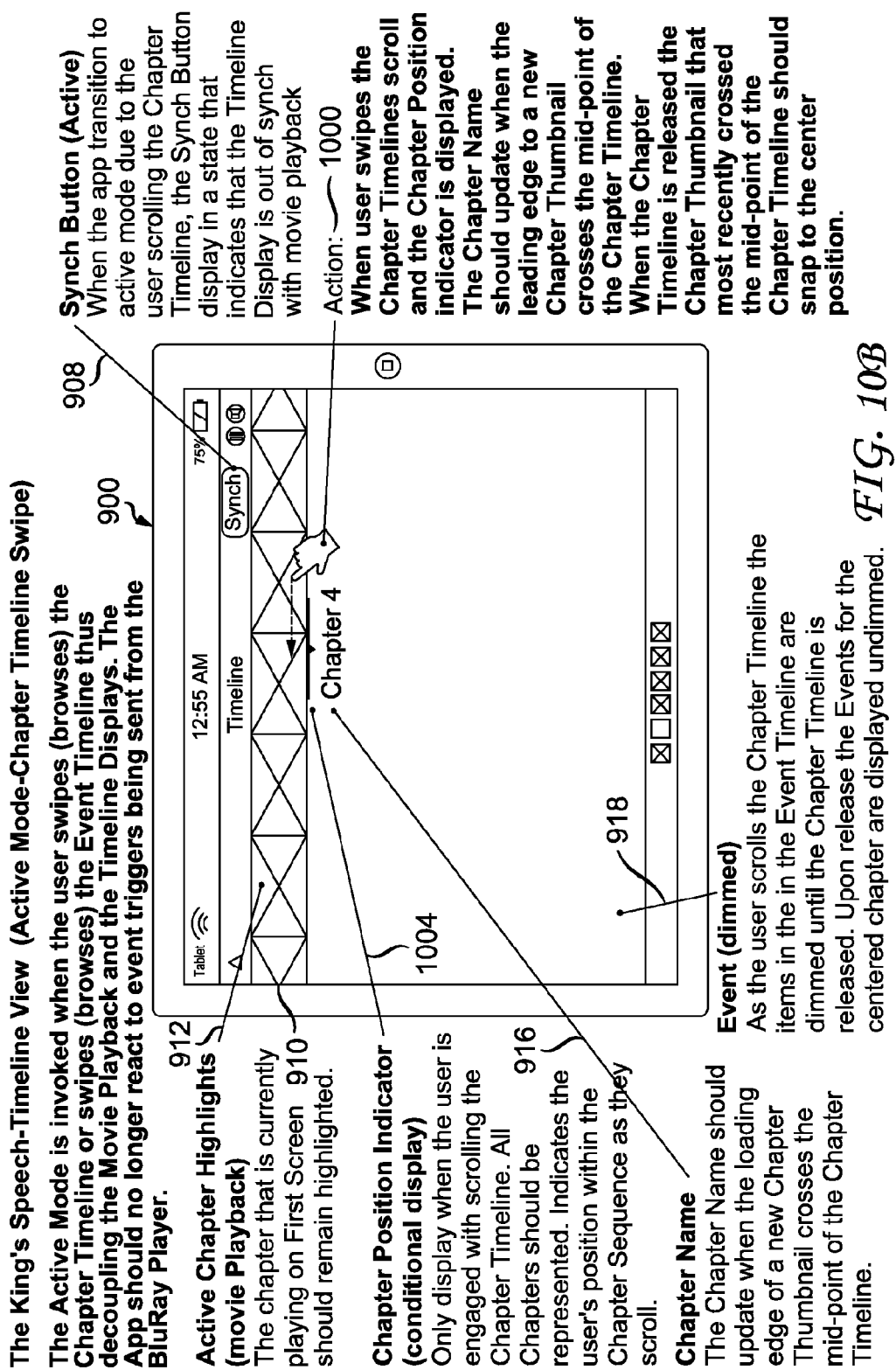

FIG. 10B depicts one embodiment of the screen 900 when a user interacts with the chapter timeline 910. In this example the synch button/icon 908 indicates that the additional content on the second screen display 520 is out of synch with the primary content on the first screen display 510. Icon 1000 represents the user scrolling through the chapter timeline 910. The current chapter remains highlighted 912 until the transition to the new chapter is completed. When navigating through the chapter timeline 910 a chapter position indicator 1004 is provided that indicates what chapter of the available chapters is selected. The chapter indicator 916 also indicates the selected chapter and updates when the transition to the new chapter is complete. In this example, while the user is navigating through the chapter timeline 910, the event timeline 918 is dimmed. In certain embodiments, the user may jump directly to a particular chapter by selecting the chapter from the timeline 910.

Figure 10C:
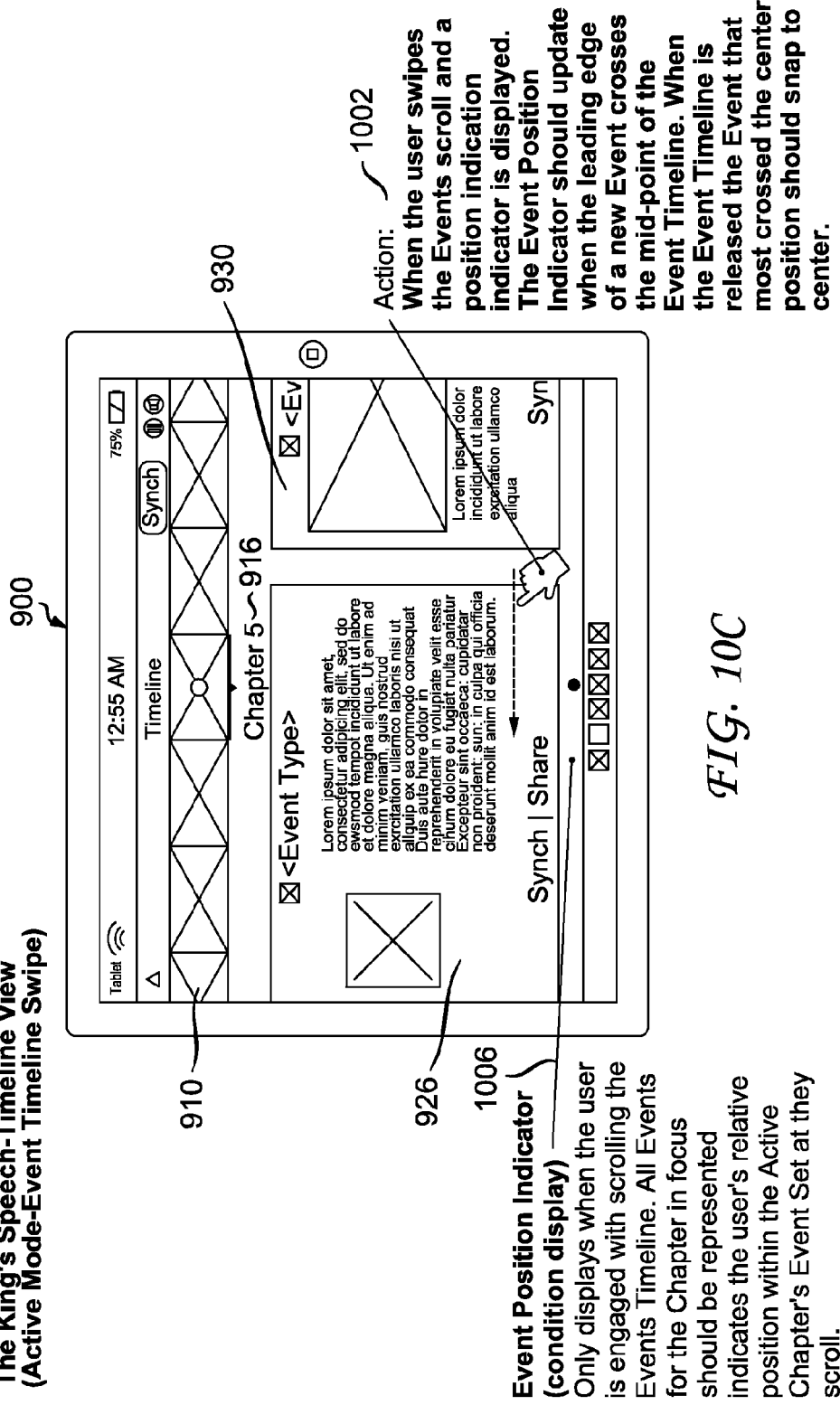

FIG. 10C depicts one embodiment of the screen 900 when a user interacts with the event timeline 918. Icon 1002 represents the user scrolling through the event timeline 918. Here, the timeline 918 is being transitioned from current triggered event card 926 to the next event card 930. When navigating through the event timeline 918 an event position indicator 1004 is provided that indicates what event of the available events is selected.

Figure 10D:
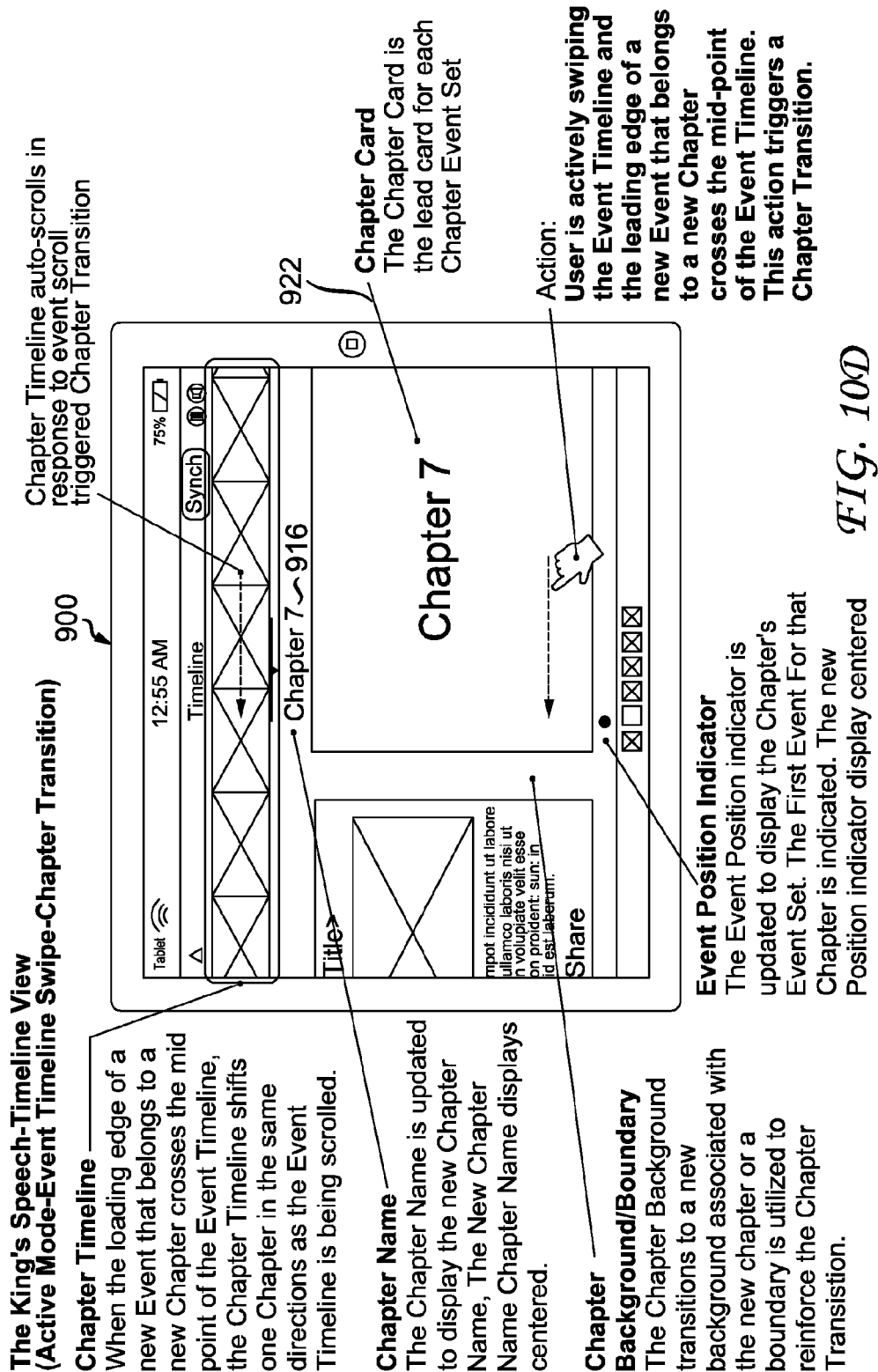

FIG. 10D depicts one embodiment of the screen 900 when a user interacting with the event timeline 918 causes a transition from one chapter to another. Icon 1002 represents the user scrolling through the event timeline 910 causing a chapter change. Here, the timeline 918 is being transitioned a new event card 922 indicating a new set of events related to a new chapter. When navigating through the event timeline 918 causes a transition to a new chapter the event position indicator 1004 is centered until the new series of events begins.

Figure 11A:
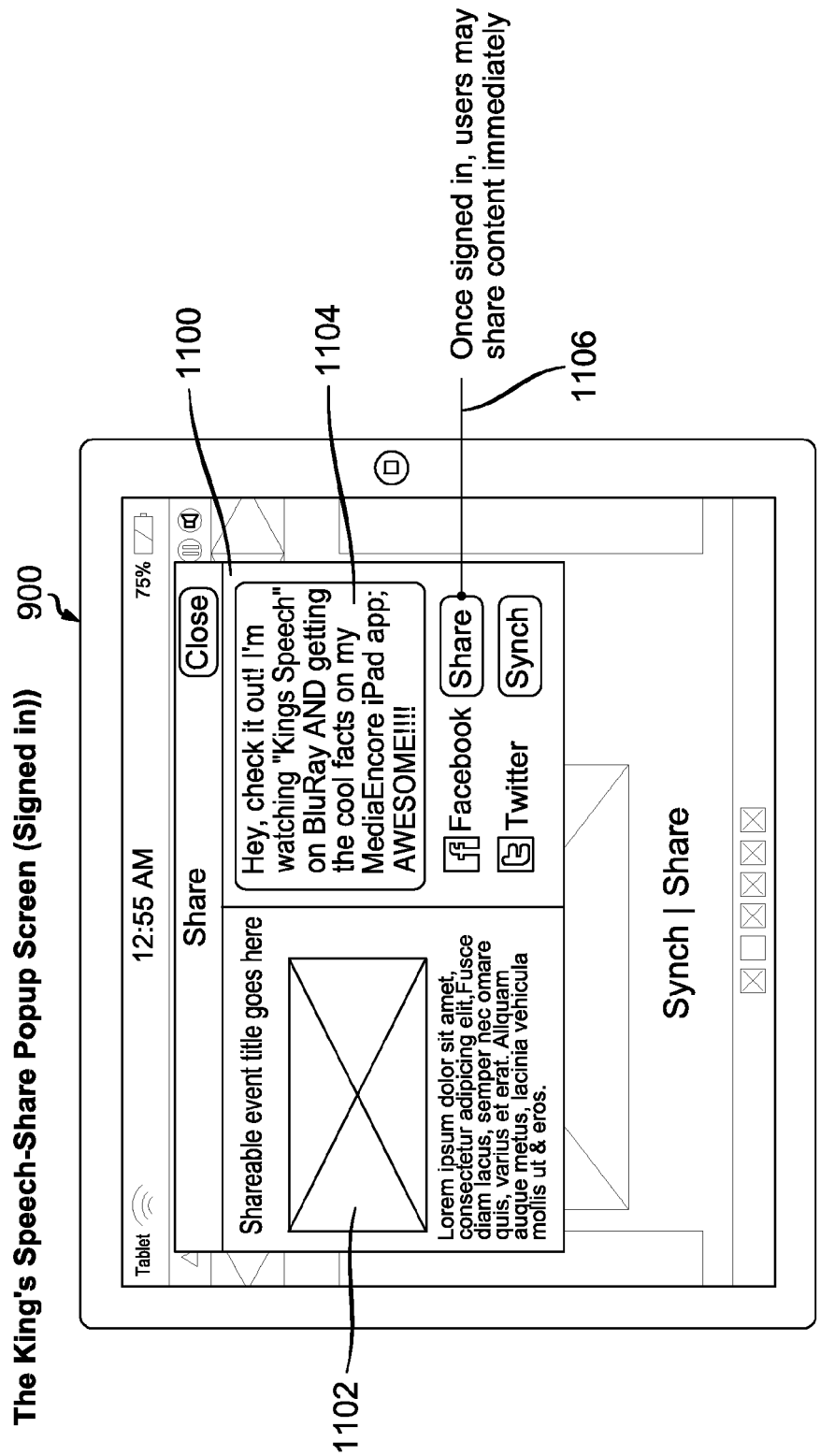
FIGS. 11A-11C are exemplary skeletal views depicting a social media sharing feature in accordance with one embodiment.
Figure 11B:
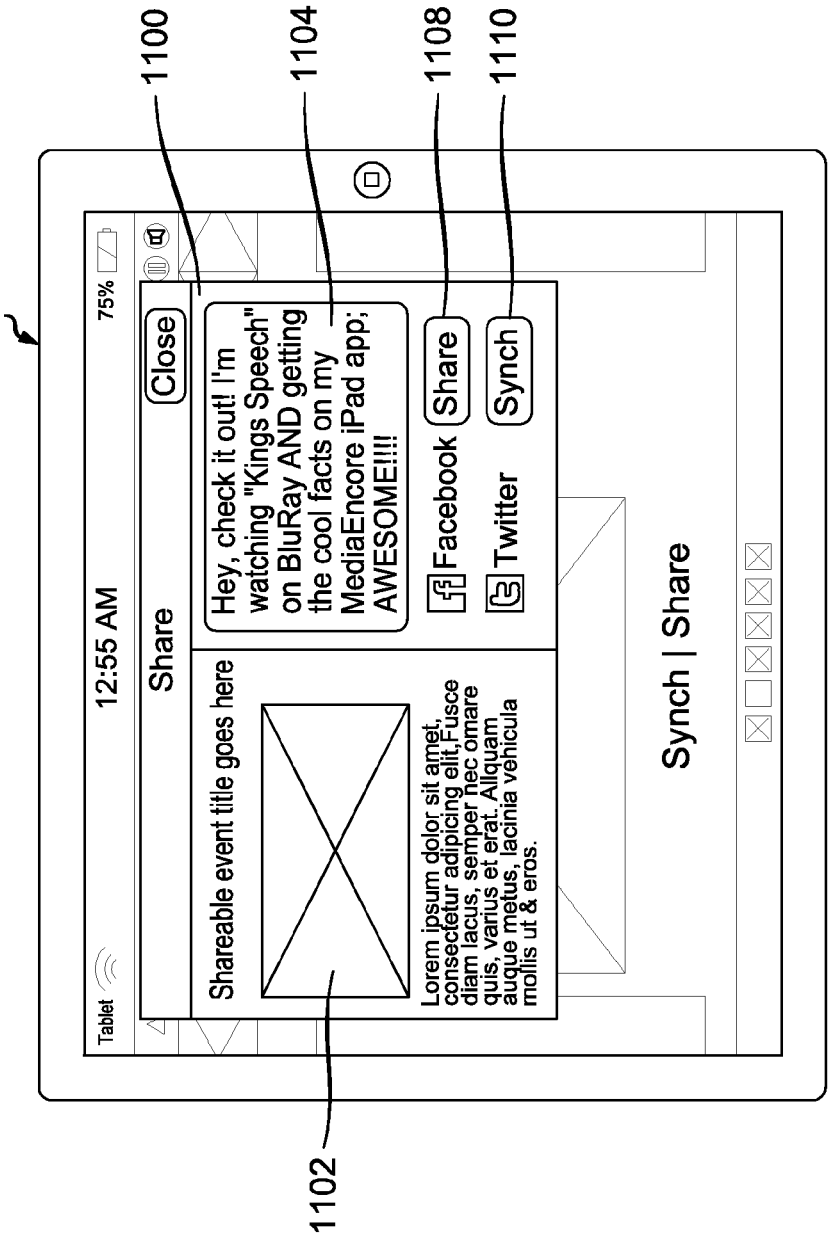
Figure 11C:
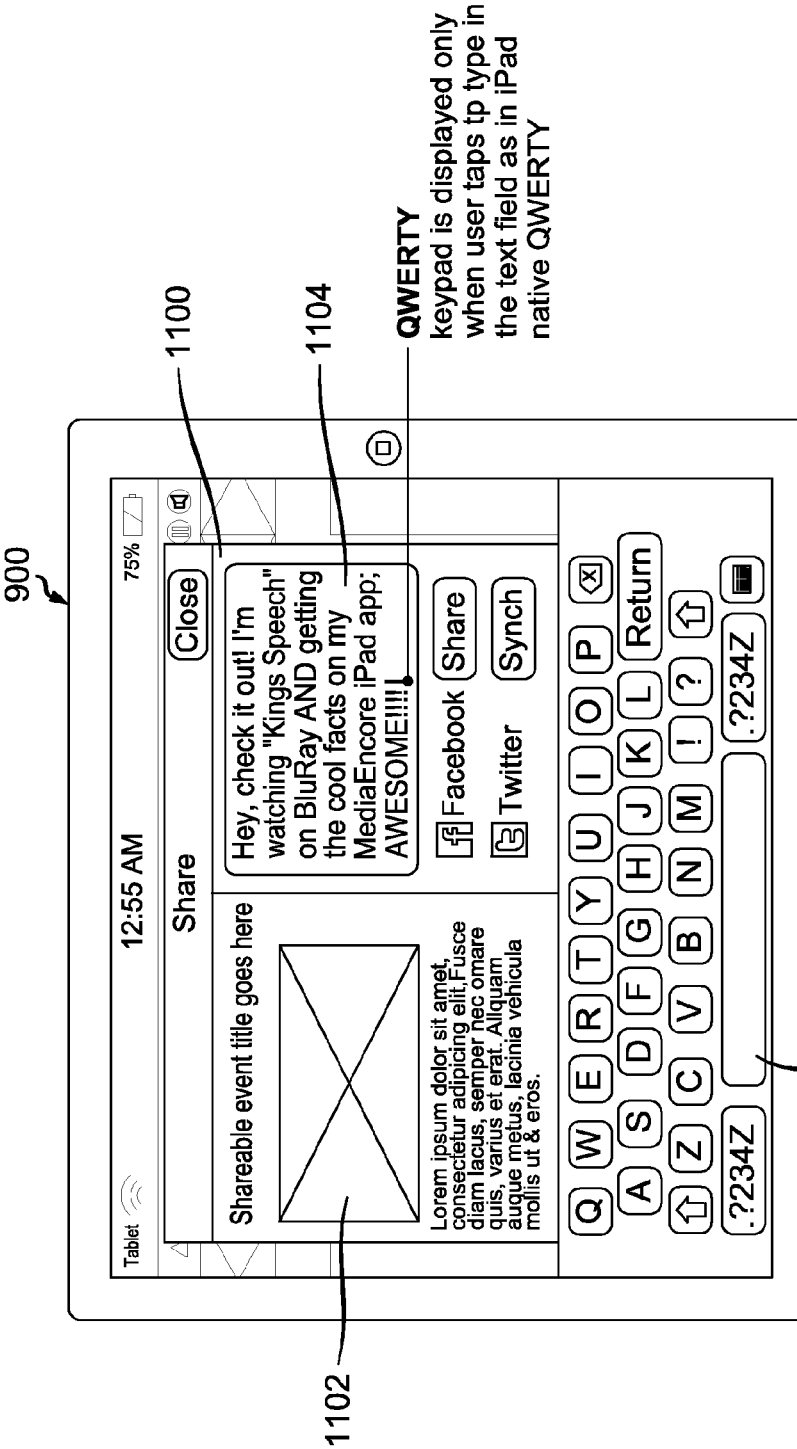
Figure 12A:
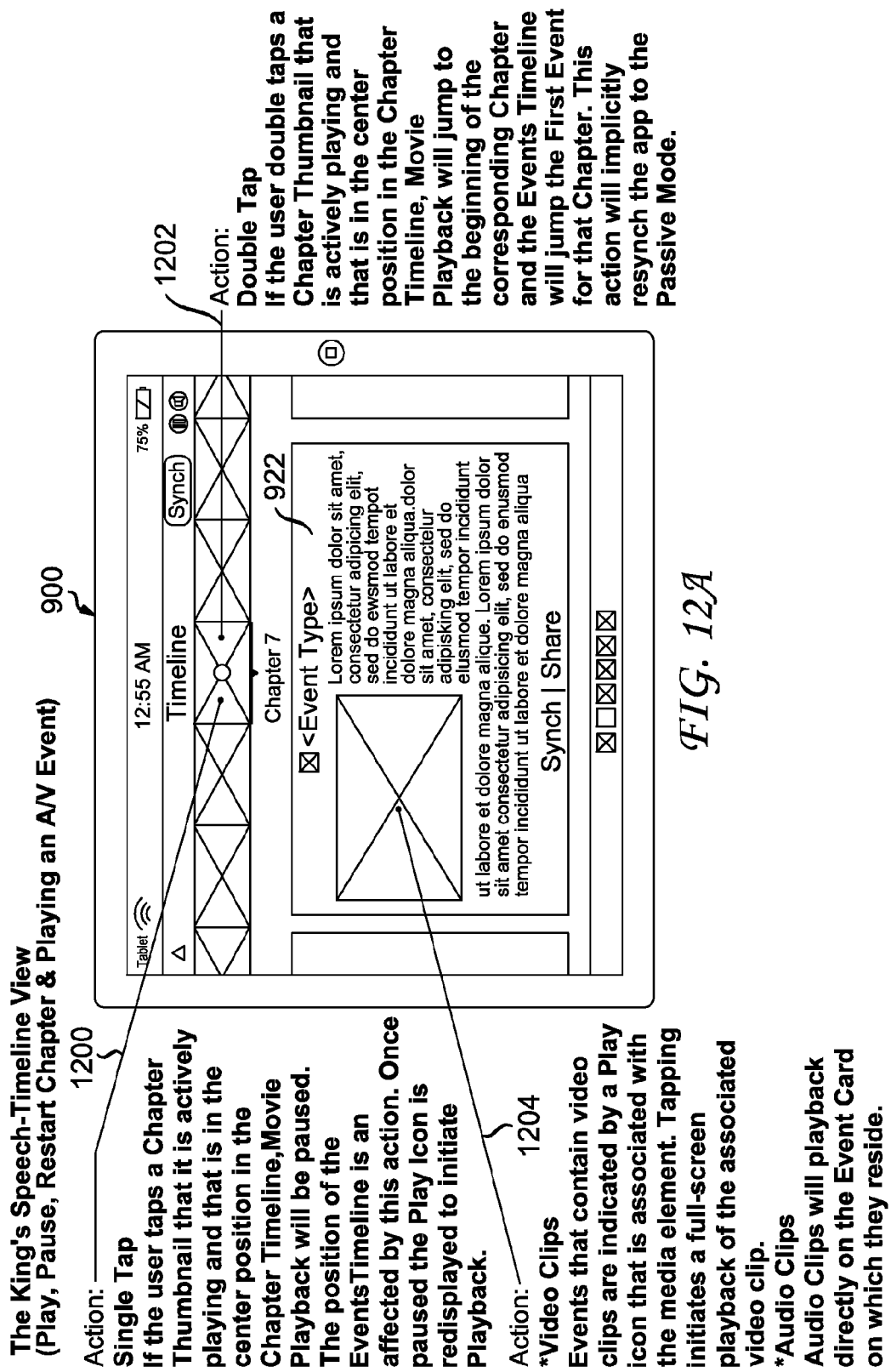
FIGS. 12A and 12B are exemplary skeletal views depicting a content selection features in accordance with one embodiment.
Figure 12B:
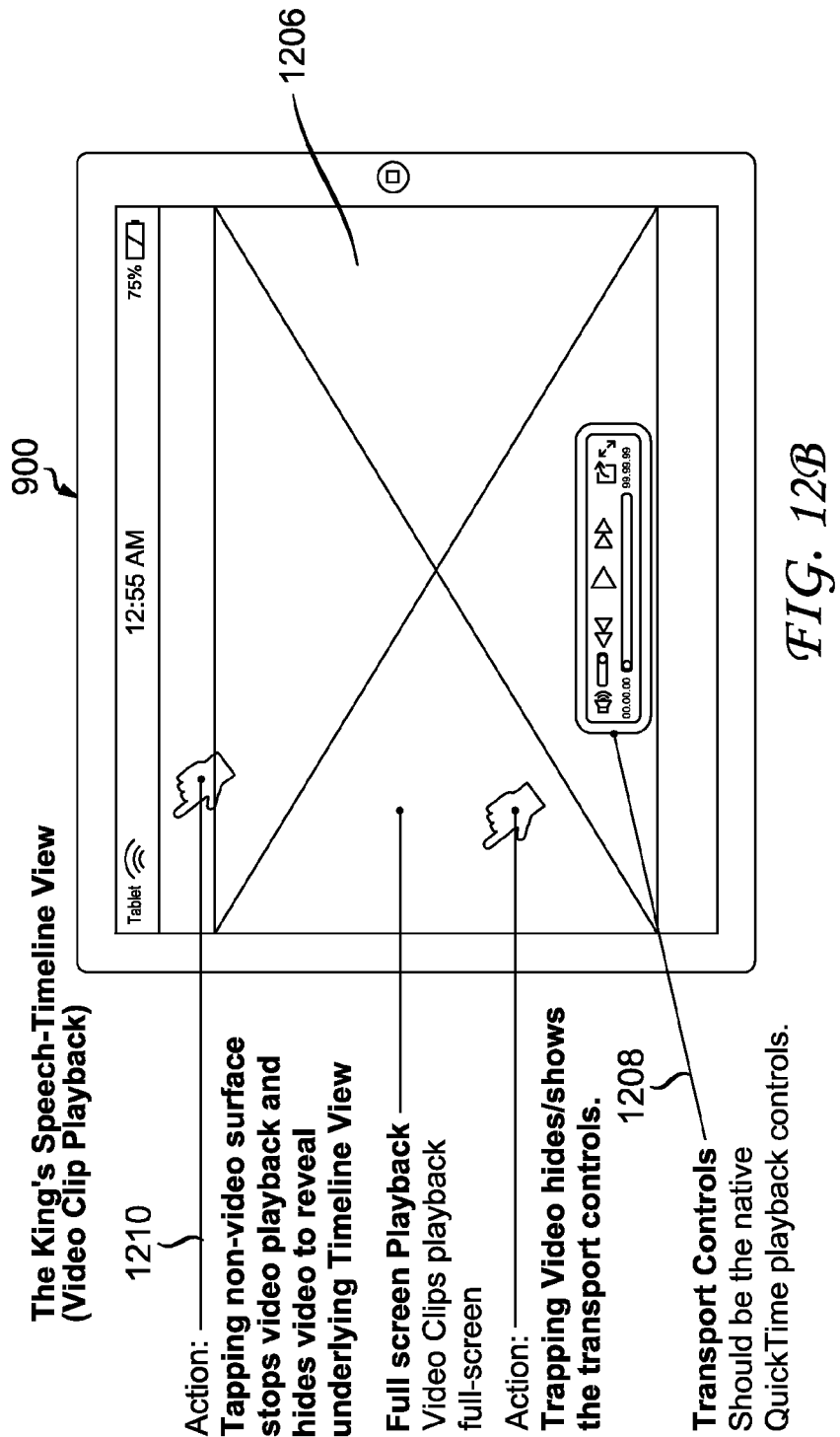

FIGS. 11A-C and 12A-B indicate some of the other interactive activities that can be accessed via the event cards 922. FIGS. 11A-C depict the social media sharing feature. FIGS. 12A-B depict the chapter selection as well as selection and playback of additional media files.

FIG. 11A-C shows various pop-up fields on the display 900 when the sharing feature is active via the share button/icon 937. FIG. 11A shows the field 1100 displayed when the user has logged into their social network (in this case Facebook). Area 1102 indicates the event being shared and area 1104 indicates the comments the user is going to share about the event. Button 1106 provides the mechanism to submit the event and comments to be shared. FIG. 11B shows the field 1100 displayed when the user has not yet signed in to the social network. In this example button 1108 is provided to sign into Facebook and button 1110 is provided to sign into twitter. Options to sign into other social networks may also be provided. FIG. 11C shows a onscreen Qwerty keyboard 1112 that may be used to enter comments into area 1104 for user's comments. In certain embodiments, this may be a default keyboard provided by the second screen device 520.

FIG. 12A-B shows the selection of chapters as well media content for playback by the user. In the example of 12A, if the user single taps 1200 the currently playing chapter shown in the chapter timeline 912 the playback on the first screen device 510 is paused. If the user double taps 1202 the currently playing chapter shown in the chapter timeline, playback of on the first screen device will jump to the beginning of the chapter and the events timeline 918 will be set to the first event of that chapter. In some embodiments, the event cards 922 may include media files 1204 such as video or audio clips. If the media file is an audio clip, then selection of the audio clip results in playback on the current screen 900. If the media file is a video clip, then selection of the video clip results in the launching of a full-screen media player 1206 as seen in FIG. 12B. In this example the media player includes on-screen controls 1208. To return to the previous screen, the user only needs to tap the non-video surface 1210 of the media player.

Figure 13B:
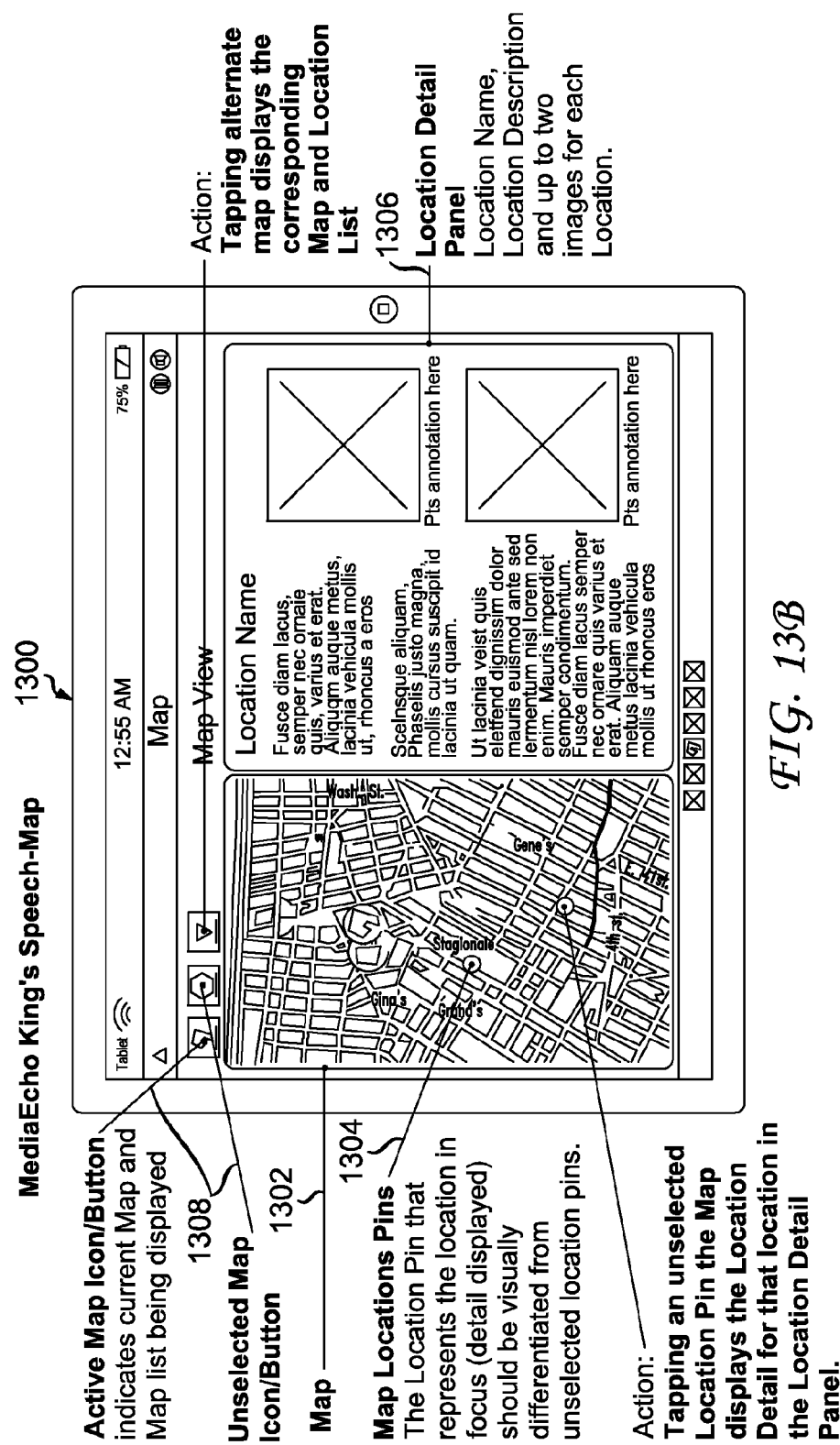
Figure 13C:
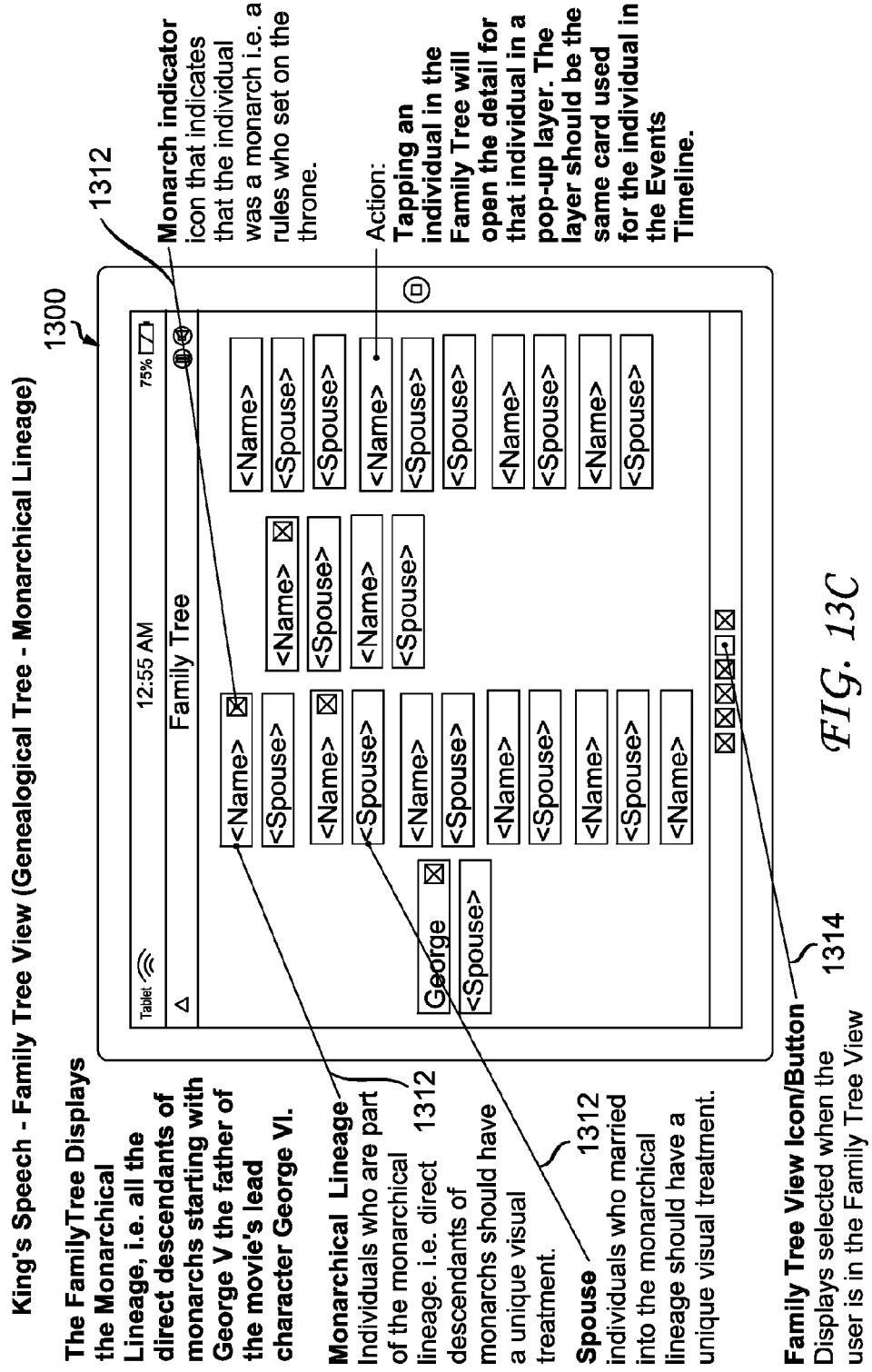
Figure 13D:
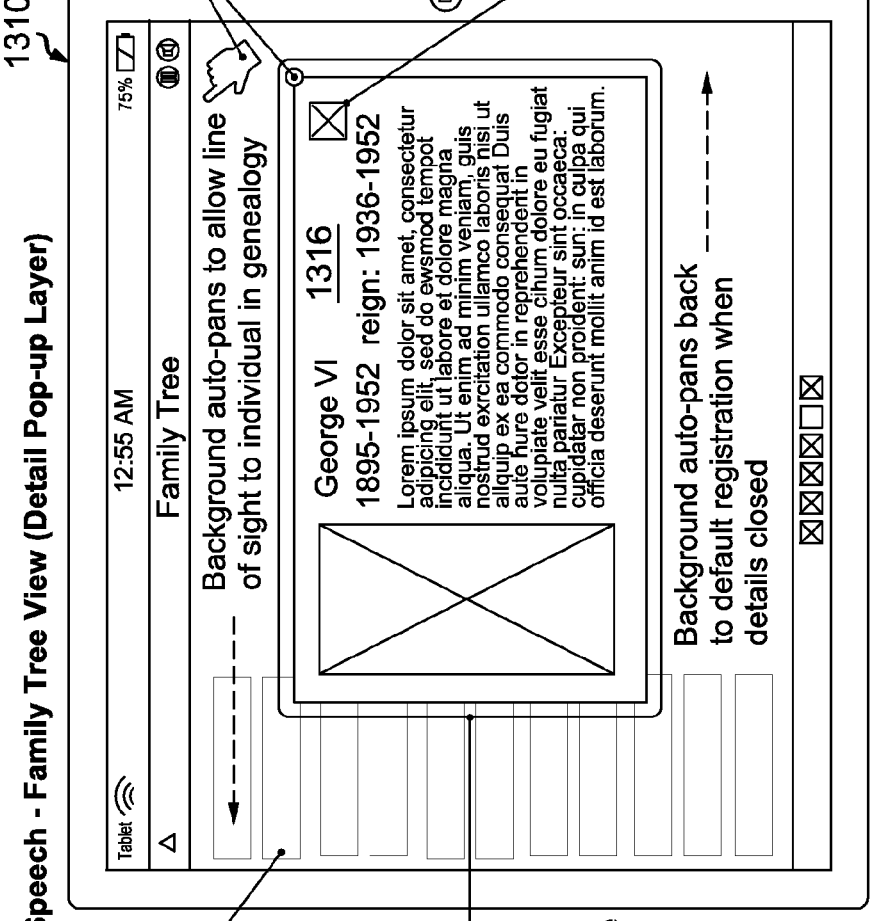
Figure 13E:
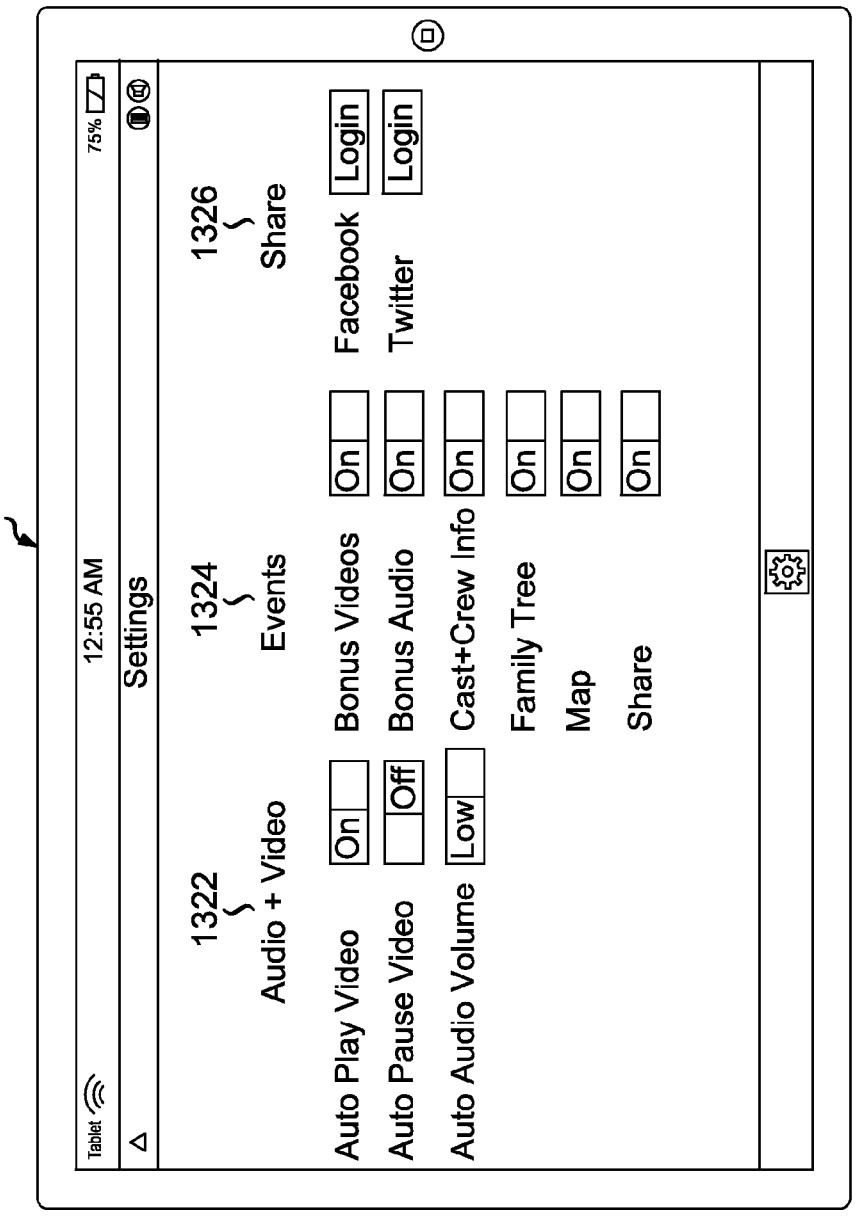

FIG. 13A-E depicts some other possible features regarding the additional content. These include a map view 1300, family tree 1310, and settings 1320. FIG. 13A depicts the menu bars for these options. In this example each of these menu bars are provided with first screen device controls 1330 including pause/resume and mute/un-mute. FIG. 13B depicts the map view display 1300. The map view display 1300 includes a map 1302 including marked locations 1304 and information about the locations 1306. Icons are also provided to select other maps 1308. FIG. 13C depicts the family tree view 1310. The family tree view shows the family tree with fields 1312 indication the relationship between the family members. In this example the button/icon 1314 at the bottom indicates what view is currently being shown (i.e. the family tree view). If a field 1312 is selected, a pop-up field 1316 is displayed, as shown in FIG. 13D, providing information about the person in the field 1312. FIG. 13e depicts the settings view 1320. In view 1320 the user is provided with controls for adjusting the preferences for the audio and video 1322, events 1324, and social network sharing 1326.

Figure 14A:
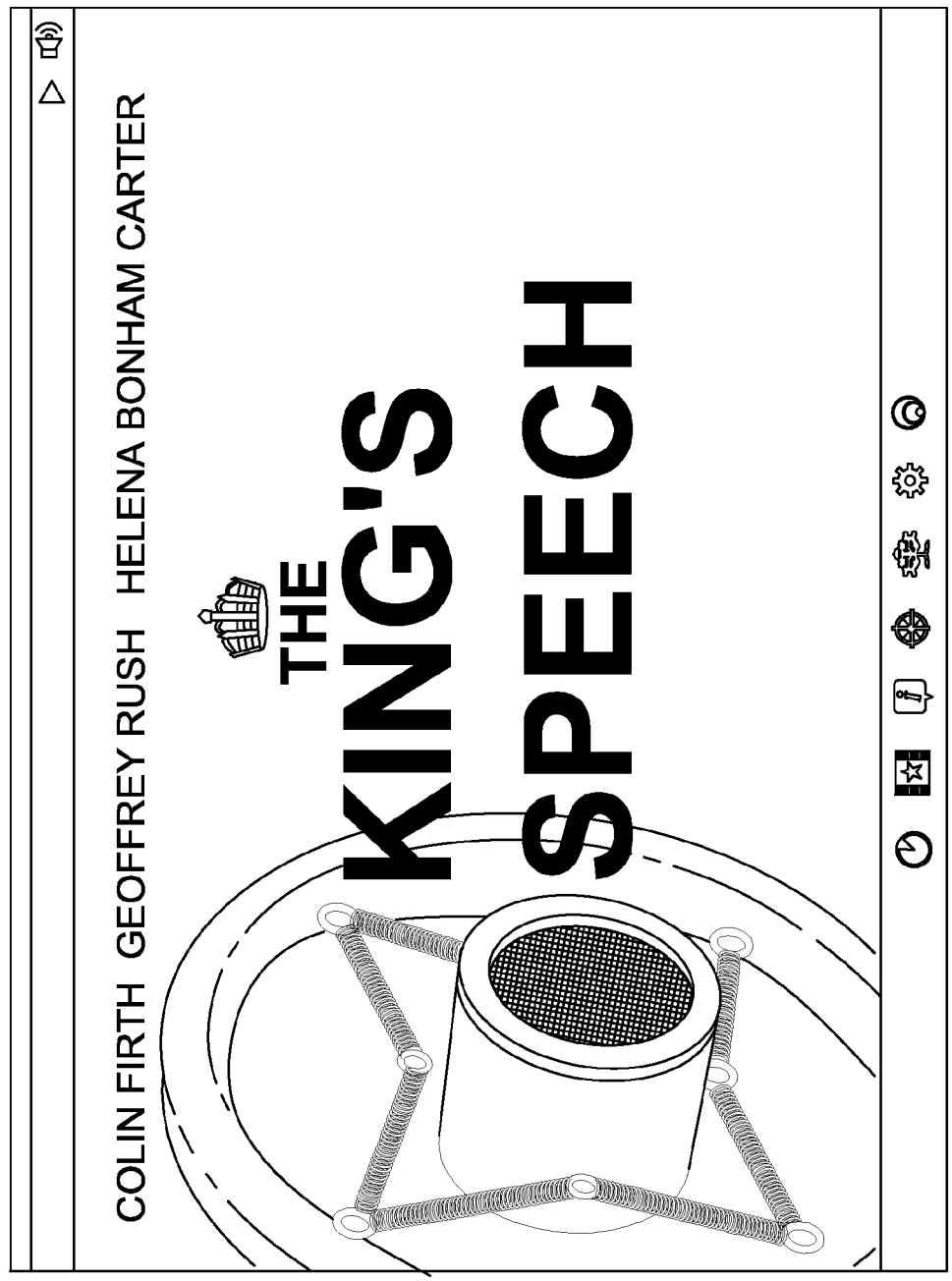
Figure 14B:
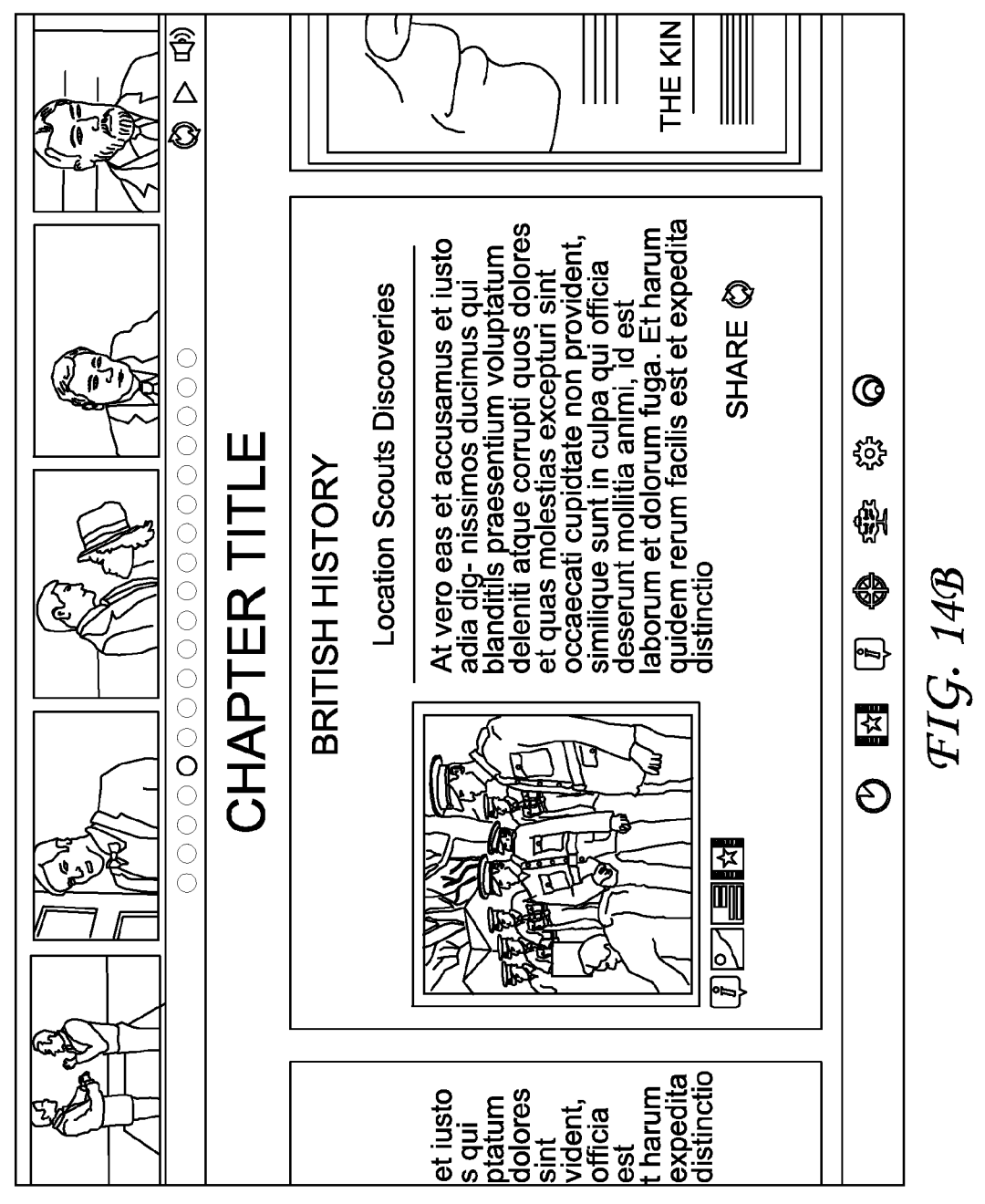
Figure 14C:
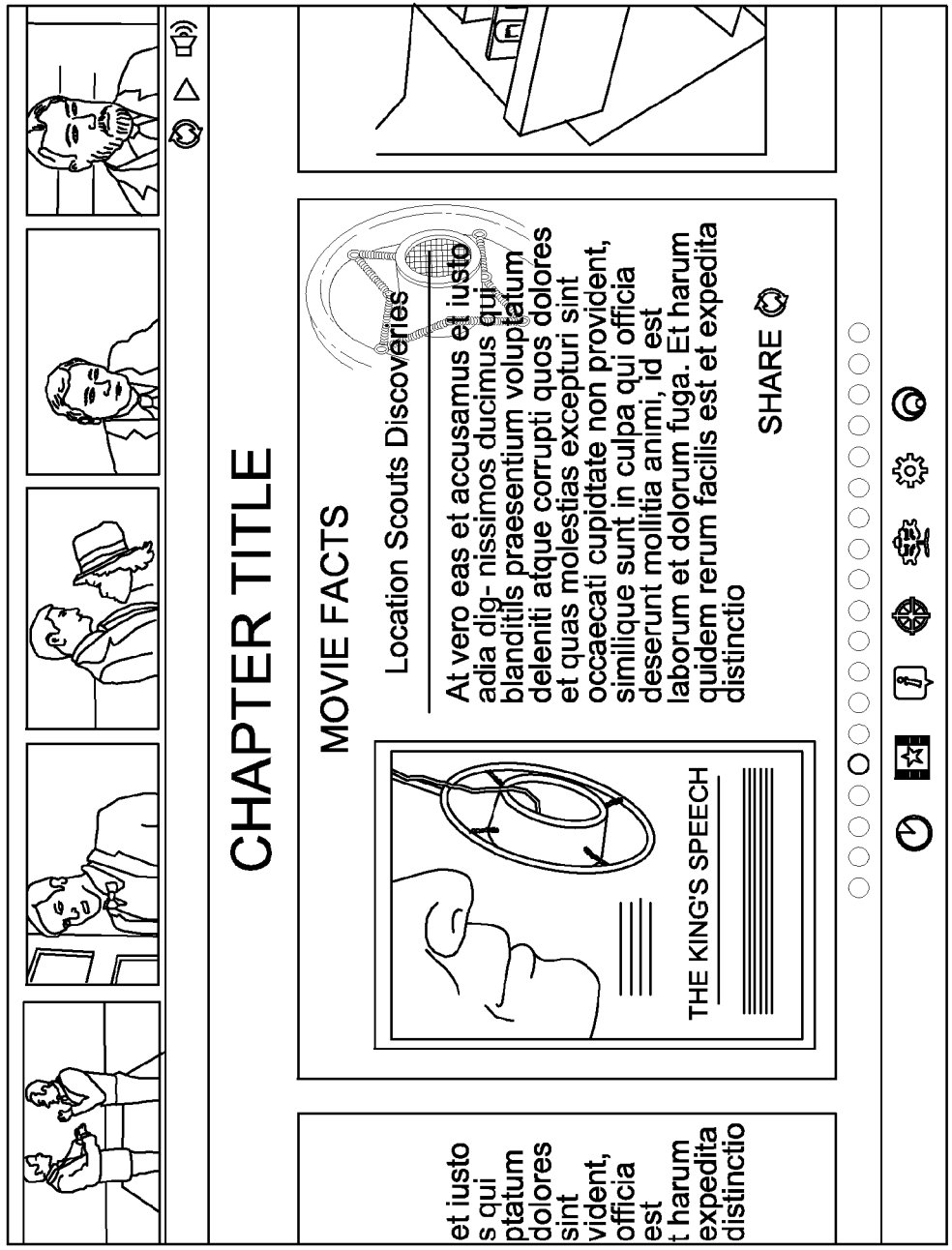
Figure 14D:
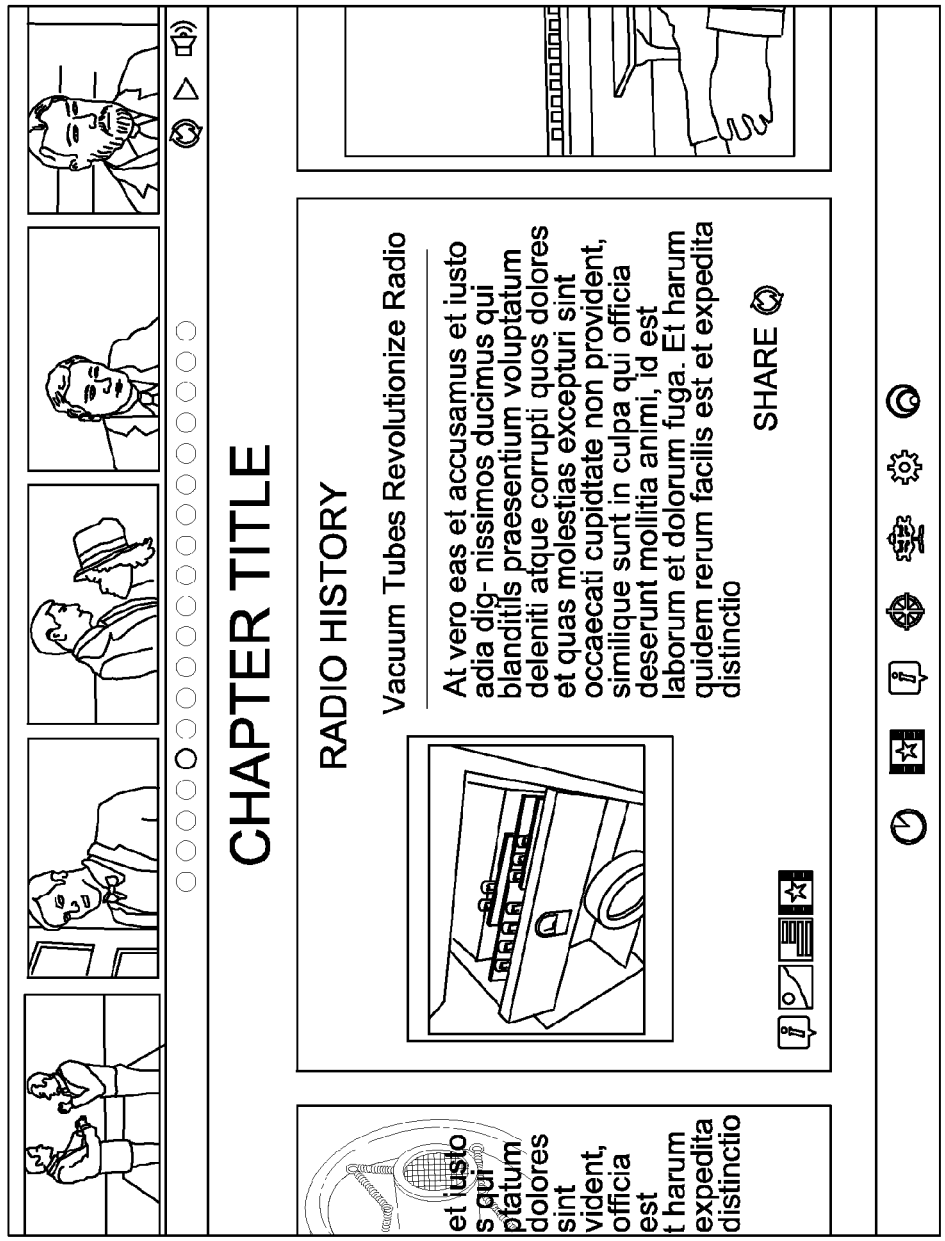
Figure 14E:
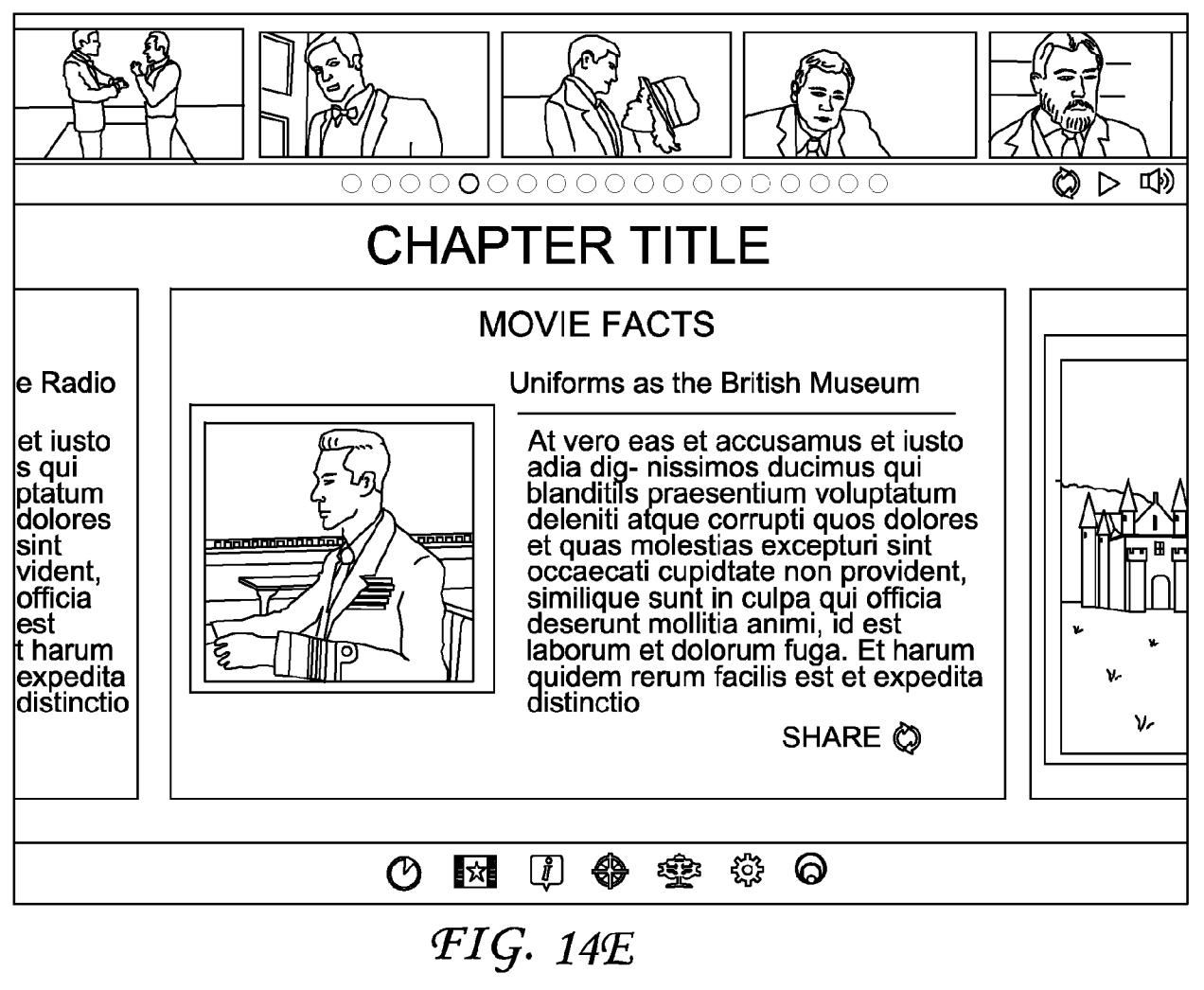
Figure 14F:
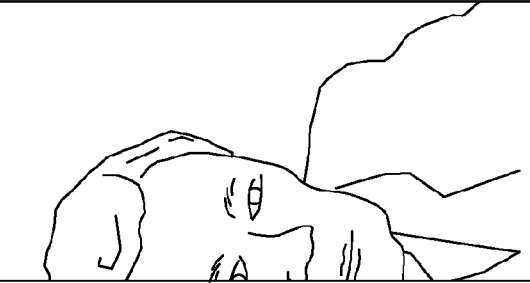
Figure 14G:
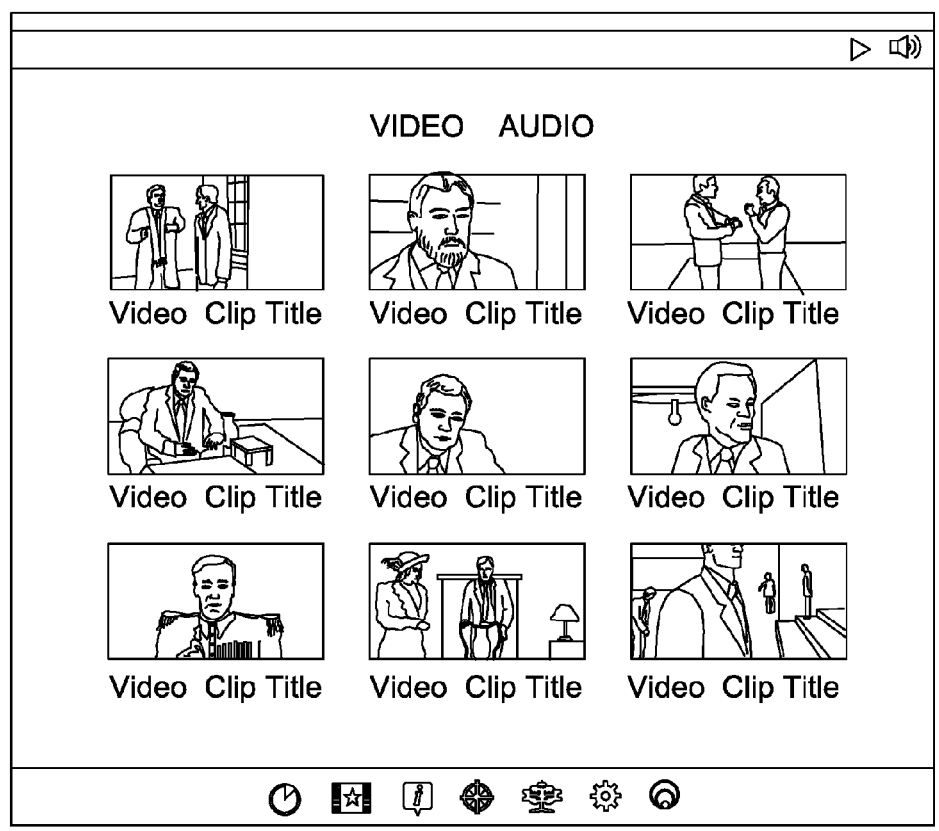
Figure 14H:
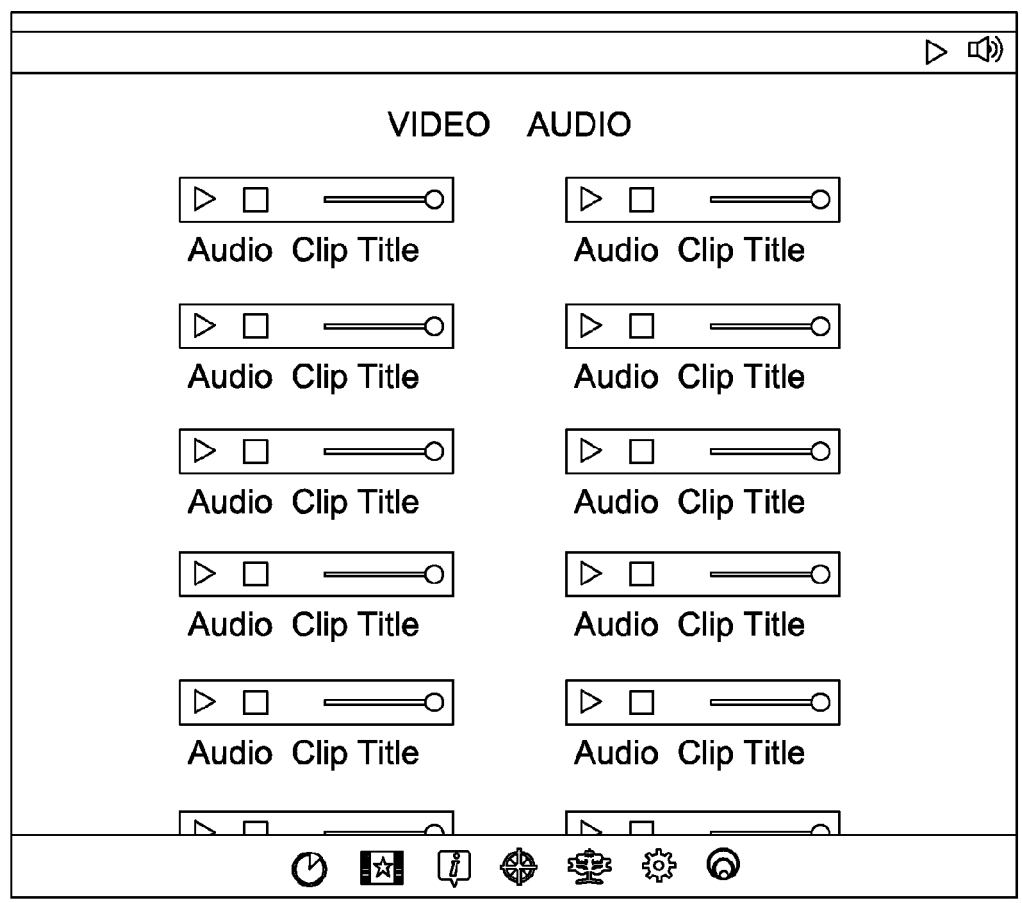
Figure 14I:
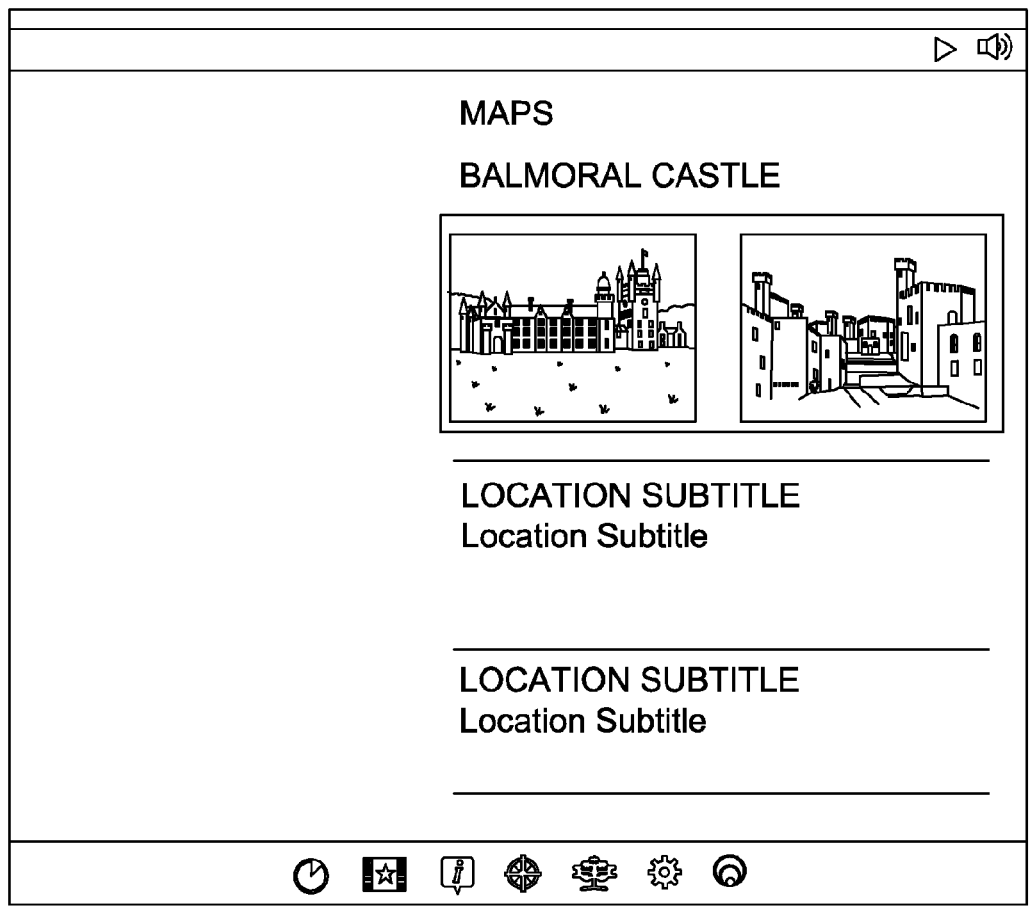
Figure 14J:
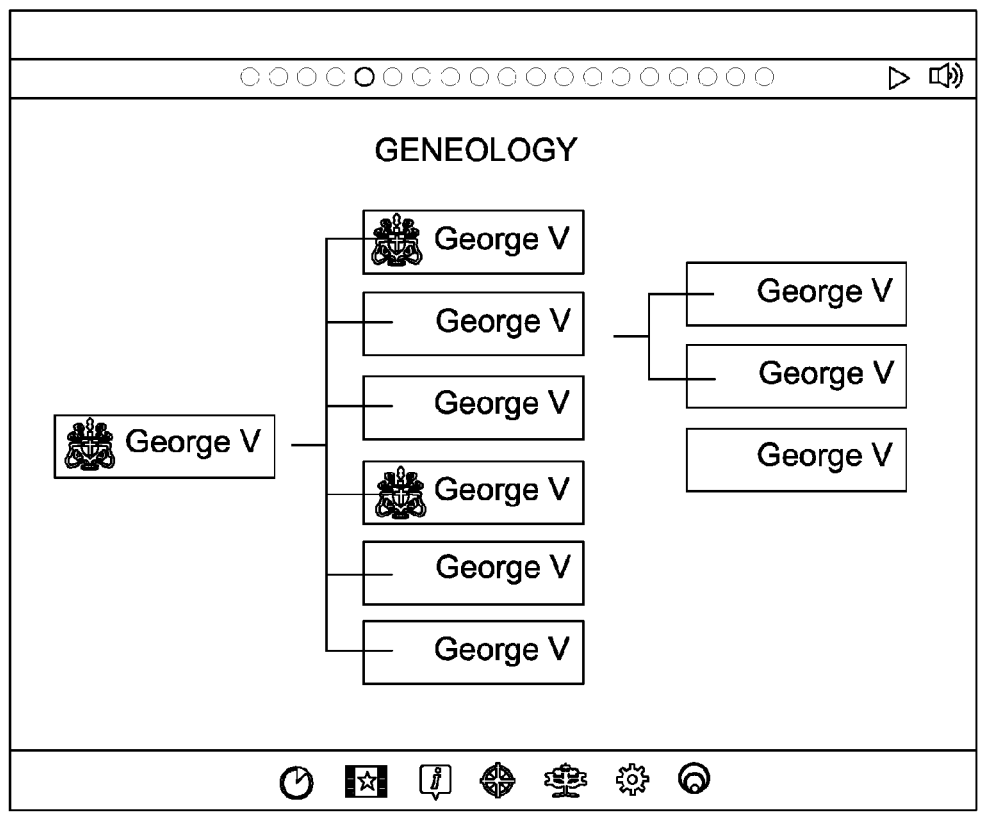
Figure 14K:
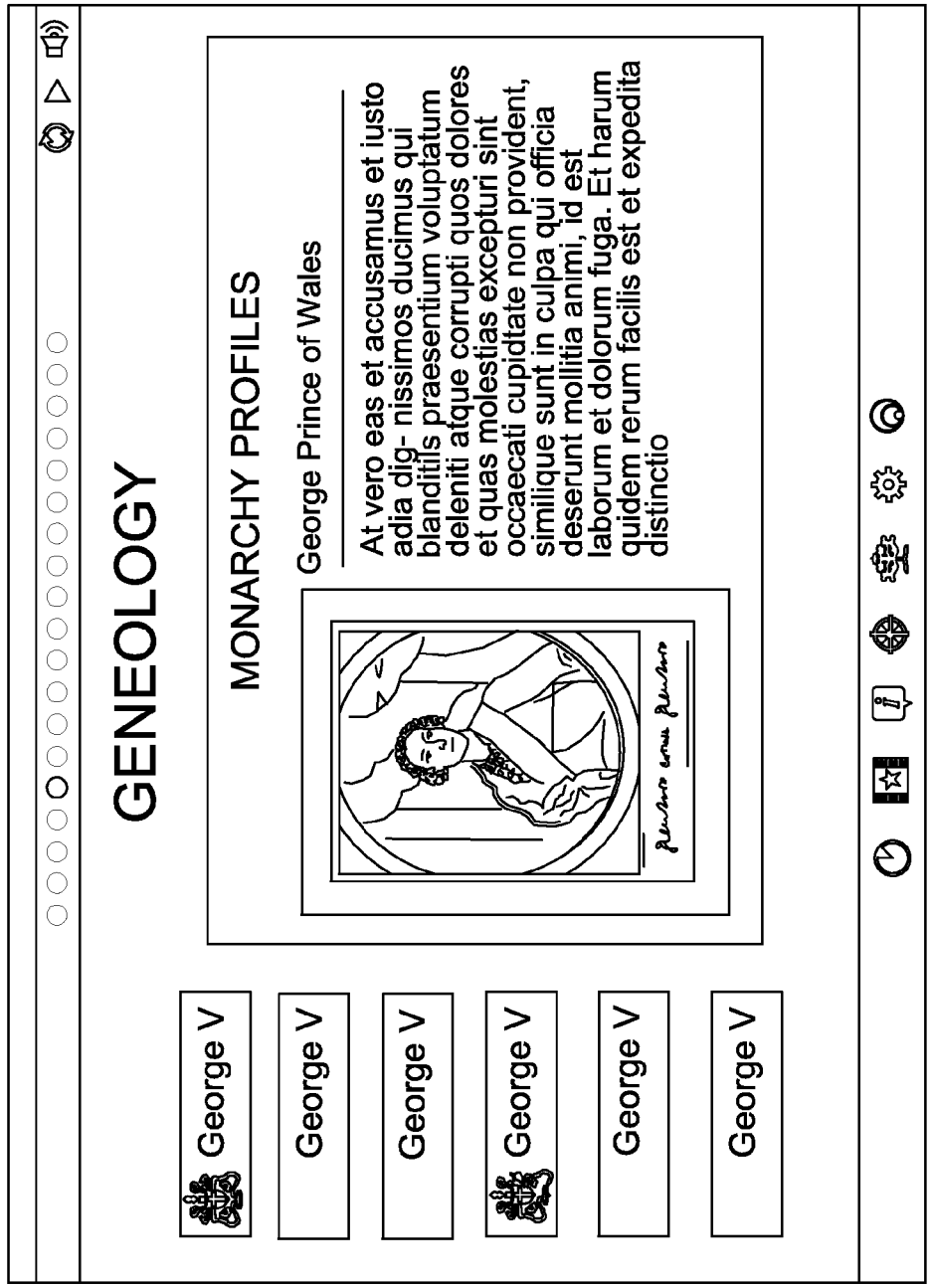
Figure 14L:
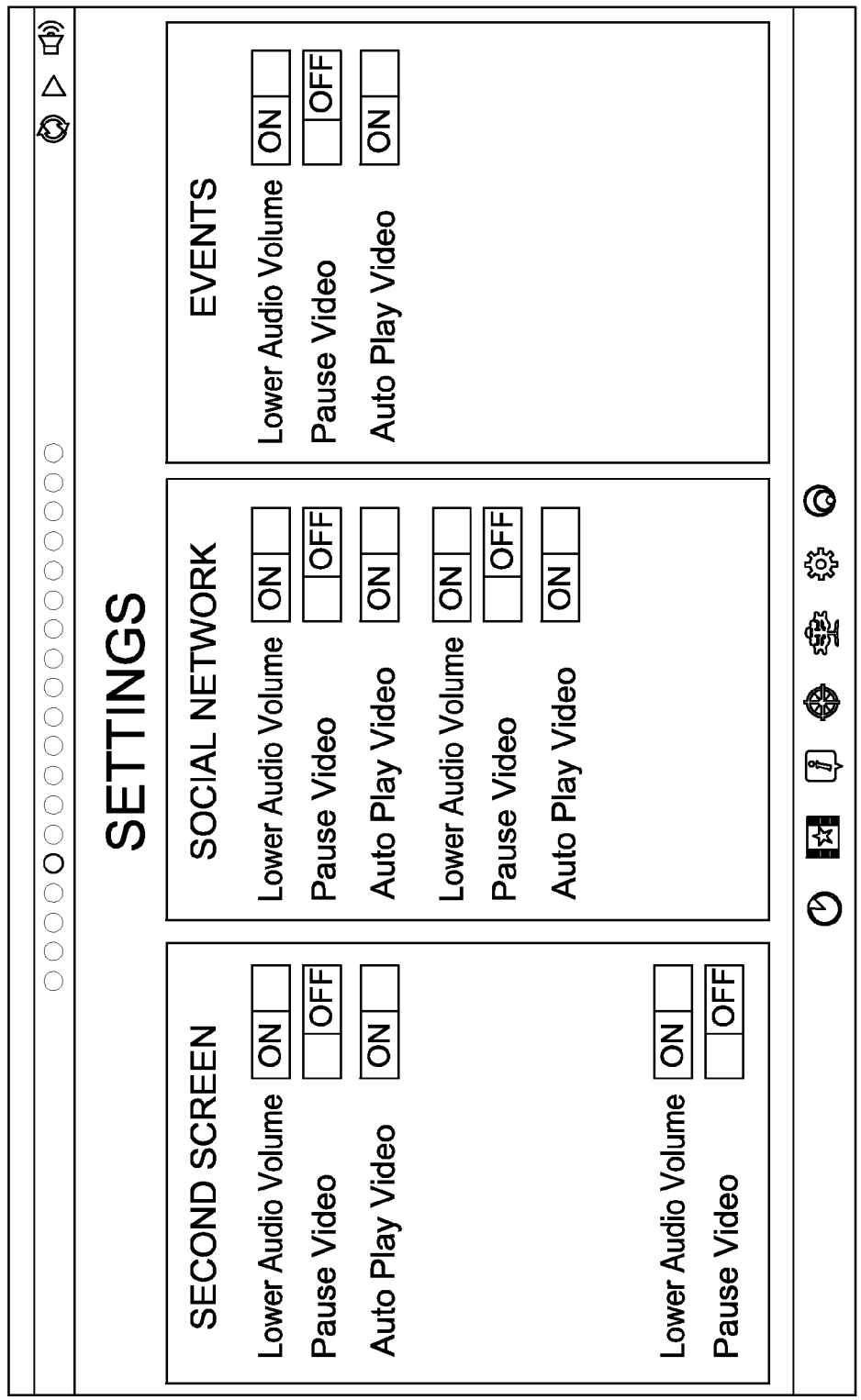

FIGS. 14A-L depict skinned examples of what may be displayed on the screen 900 of the second screen device to a user when using an application that provides additional content on the second screen device 520 that is synched with the primary content on the first screen device 510. FIG. 14A is a skinned version of the splash screen as shown and described in relation to FIG. 9A. FIGS. 14B-F depict skinned versions of the timeline view as seen and described in relation to FIGS. 9C-F and 10A-D. FIG. 14G depicts a skinned version of a screen display wherein all the available video clips that are part of the additional content are displayed for the user. FIG. 14H depicts a skinned version of a screen display wherein all the available audio clips that are part of the additional content are displayed for the user. FIG. 14I depicts a skinned version of the maps view as shown and described in relation to FIG. 13B. FIGS. 14J and 14K depict skinned version of the family tree view as shown and described in relation to FIGS. 13C and 13D respectively. FIG. 14L depicts a skinned version of the settings view as shown and described in relation to FIG. 13E.

The events and features shown in the figures are just some examples of possible events. In certain embodiments, a user may be able to configure or otherwise select what events they wish to be shown (e.g., don't show me purchase events). In other embodiments the user may be able to select or bookmark events for viewing at a later time. In still other embodiments certain events may unavailable or locked out depending on the version of the program being viewed (i.e. purchased vs. rented or BD vs. VOD vs. Broadcast). In other embodiments, the events available can be personalized for a user based on previous viewing habits (i.e. in system such as TIVO where a user's viewing habits are tracked or using the personalization engine 118 of FIG. 1).

Other possible configurations include shopping features. For example, a store front could be provided and accessible from the second screen to for purchasing movie merchandise. In another embodiment points or awards could be provided to a user for watching, reviewing, or recommending a program or film. For example, the more movies watched or shared with friends, the more points awarded. The points can then be used for prizes or discounts on related goods.

Similarly, achievements can also be awarded. These achievements could be pushed to a social networking site. Example achievements could include:

Watching certain scenes—Achievement
Watching certain discs in a series—Achievement
Watching certain discs by a particular studio or actor—Achievement In still other implementations a Wild feature could be implemented. A running Wiki could let a user and other users of a disc comment on certain scene. For example, tacking metadata could be created which is pushed to a web based wild. Such metadata could include:

Chapter Information
Time Codes
Thumbnails of Scenes
Actor/Director Information

This pushed information can be used to create a running Wiki which lets others comment on the movie. These comments could then be reintegrated into the second screen application as events which can be accessed.

Additional features and screens are also possible. For example in some embodiments multiple synching mechanisms may be implemented and available to synching the content on the second screen to content on the first screen. Furthermore when multiple synching mechanisms are available, priority may be assigned to the synching mechanism wherein higher priority synching mechanisms will be used over lower ranking mechanism.

Figure 15:
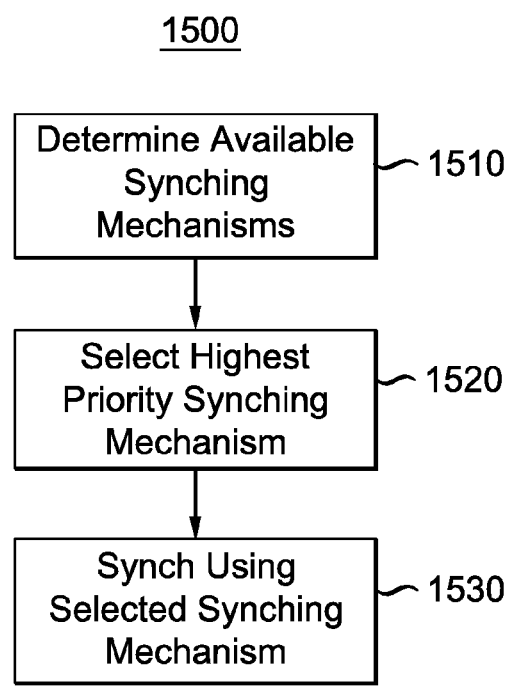
FIG. 15 is a diagram depicting an exemplary methodology of synching between devices in accordance with one embodiment.

FIG. 15 depicts a flow chart 1500 of one such methodology for handling multiple synching mechanisms. In this example there are three primary steps. First, it is determined what synching mechanisms are available (step 1510). Then, the highest priority mechanism of the available synching mechanism is selected (step 1520). The selected synching mechanism can then be used to synch content on the second screen device with content on the first screen device (step 1530). Each of these steps will be described in more detail below.

Referring to step 1510, there are several possible synching mechanisms that can be used. Some examples include: Audio Fingerprint detection, Audio Watermarking, Video Metadata Sync, and BDLive Synch. These are discussed briefly below.

With Audio Fingerprint Detection the audio of the media is separately indexed into a database for later lookup. The second-screen app samples audio, sends the sample to a service (typically a backend server) and the service returns with the identification of the media. Typically this solution is used to generally identify the content without providing any timing information. A disadvantage of this is subject to environmental considerations such as volume of audio, ambient noise, distance from speakers to the microphone. This makes this a less ideal synching mechanism.

With Audio Watermarking the program is preprocessed to encode identifiers within the audio track at known locations. In some instances the audio identifiers can be high frequency so as to be outside the range of normal human hearing. This information can be used for time or event-based synchronization in the second screen app. Some advantages of this mechanism over Audio Fingerprinting is that it is less susceptible to interference with background or ambient noise as well as the ability to correlate the identifier to time.

With Video Metadata Sync a video stream (e.g. DVB) is encoded with additional metadata corresponding to known time locations. A set-top box or other playback device decodes the metadata stream and provides position information to a second-screen app upon request. The associated advantage of Video Metadata sync over audio is the relative reliability of the sync connection (TCP socket communication).

With BDLive Sync a BluRay disk is produced to include a service that is launched when a BluRay Disk is played. The second screen device using an application queries the service for position information (or the app can subscribe to events). The information is then used to synchronize second-screen content to primary media playback. The associated advantages of BDLive Sync is the reliable connection and the additional capability to control media playback (play, pause, etc).

Figure 16:
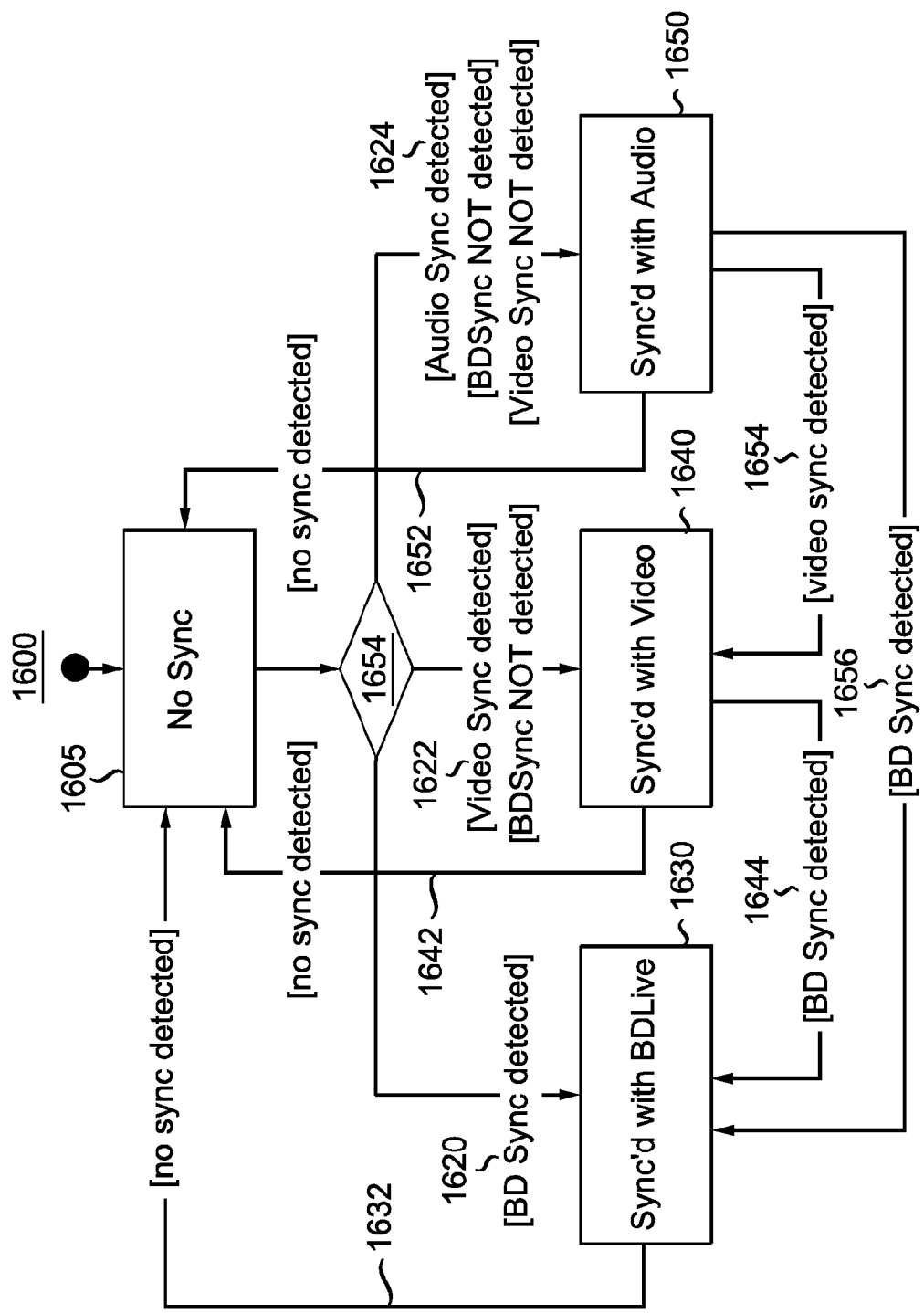
FIG. 16 is a diagram depicting prioritization of synching option in accordance with one embodiment.

The present disclosure provides a process for dynamically switching between the various options within a single second-screen app. The advantage of this is that not only can the second-screen synching support multiple methods but synchronization can be achieved in priority order (step 1520). Priority, in turn, can be established based on the virtues associated with each synchronization methods. An example of this can be seen in the flow diagram 1600 FIG. 16. In this example, the process starts with no synchronization mechanism being detected (1605). At branch 1610 a determination of available synching mechanism is made (step 1520 of FIG. 5). A determination of the priority for each of the available synchronization mechanisms is made. Synchronization is achieved in priority order. When a higher priority mechanism is available the system switches to that mechanism. If current sync is lost then the lower-level sync mechanisms are switched to if available.

The priority for the synchronization mechanisms may be pre-set of user specified. In this example the priorities are: BDLive, Video Metadata, and then Audio Watermark. BDLive was chosen as the top priority because a connection to BDLive for position information also affords the ability to control playback whereas the other methods do not afford the same level of control.

In operation, if a BD synching mechanism is detected (1620) the content on the second screen device 520 is synched with the content on the first screen device 510 using the BD synching mechanism (1630). In BluRay (BDLive) a socket connection is established between the second screen device and the playback device 530 (BD player). The second screen device 520 queries the playback device 530 for the current playback position of the video content. Compensation for network latencies is included in the communications such that the resulting playback position is more accurate. The playback device 530 uses internal mechanisms to determine the current playback position of the video content.

If a BD synching mechanism is not detected or unavailable then the process begins again (1632) to determine if the next highest priority synching mechanism is available, in this example, video metadata. If the video metadata synching mechanism is available (1622), then synching using video metadata is performed (1640). With video metadata, metadata that has been inserted into the video data is extracted to determine the playback position in the content. The playback device 530, such as a Set-top Box (STB), decodes the metadata from the video content, such as a Digital Broadcast Video (DVB) stream and makes it available to requests from the second screen device. This is similar to the BluRay version described above with the only difference being the ultimate source of the position information.

If a video metadata synching mechanism is not detected or unavailable then the process begins again (1642) to determine if the next highest priority synching mechanism is available, in this example, audio watermarking. If the audio watermark synching mechanism is available (1624), then synching using audio watermarking is performed (1650). With audio watermarks, ID's are encoded into the audio of the video stream. The second screen device 520 uses an internal microphone to sense the audio and applies a decoding algorithm to extract the ID information from the audio signal. These IDs are mapped (via an xml description file) to position locations within the video.

As before, if the audio watermark synchronization mechanism is not detected or available, the process starts again (1652). In certain embodiments the system is always looking to switch to the highest priority available synching mechanism. So if either video metadata 1640 or audio watermarking 1650 are being used and BDLive synching becomes available, then the system will switch to BDLive synching (1644 or 1656 respectively). Likewise, if audio watermark synching is being used and video metadata synching becomes available but BDLive synching is not available, then the system will switch to video metadata synching (1654) as video metadata synching has a higher priority.

In some embodiment the status of the synchronization between the content on the second screen device 520 and the content on the first screen device 510 is displayed on the second screen device 520. Examples of this can be seen in FIGS. 17 and 18*a-c*.

Figure 17:
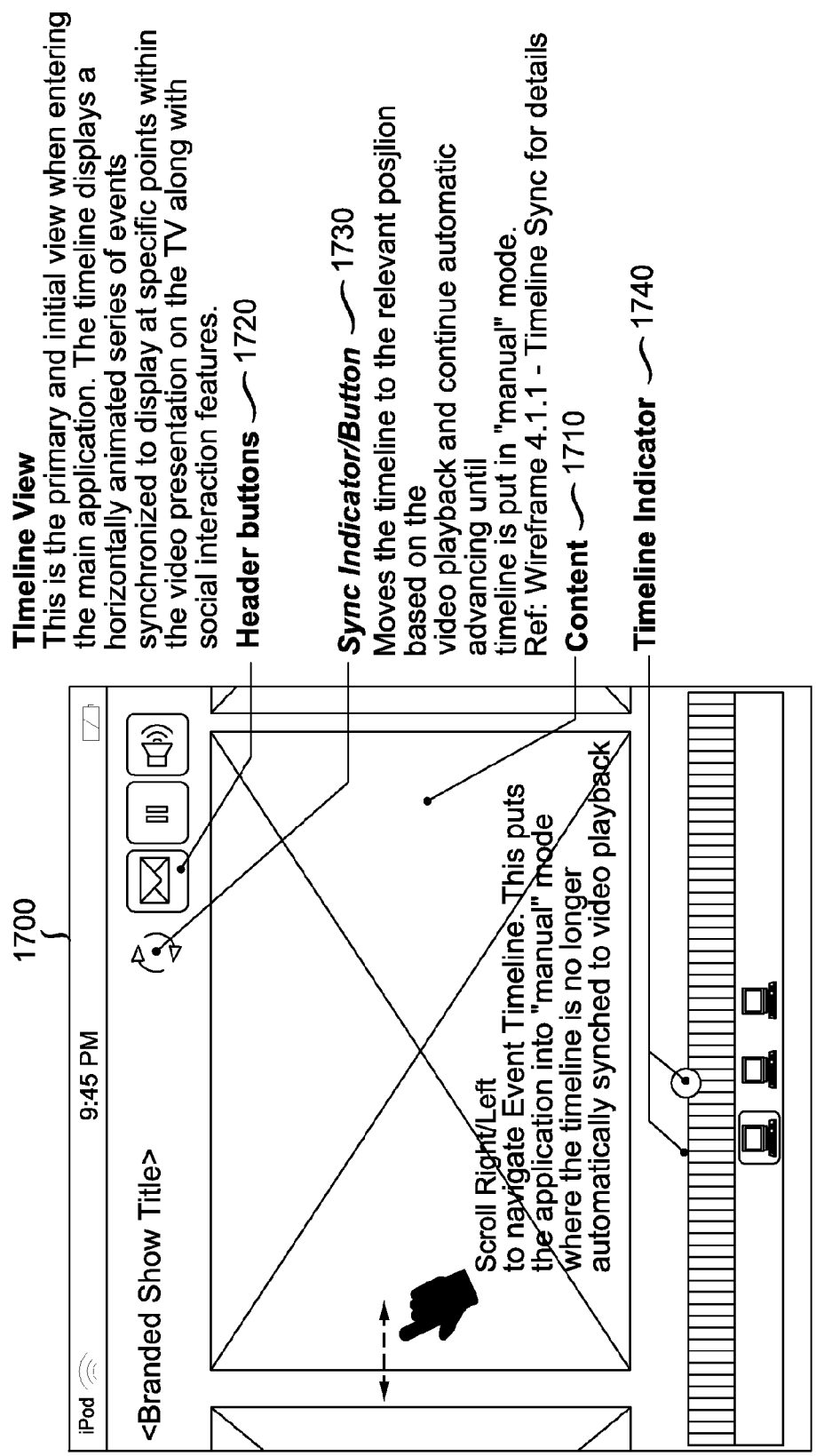
FIG. 17 is an exemplary skeletal view depicting a sync indicator in accordance with one embodiment.

FIG. 17 is a wireframe 1700 of a screen that can be displayed on the second screen device 520. In this example, the displayed screen 1700 includes content 1710 that is synched with content on a first screen device 510, buttons in the header 1720, and timeline indicator 1740 that indicates the position of the playback of the content on the first screen device 510. Within the collection of button in the header 1720 is a sync indicator/button 1730. By selecting the sync indicator/button 1730 the user synchronizes the content on the second screen device 510 with the content on the first screen device 510 using the mechanisms described above. In certain embodiments the button 1730 may also display the status of the synchronization with different icons. Examples of this can be seen in FIGS. 18*a-c*.

FIG. 18*a* is a close up view 1800 of the header buttons 1720 wherein the sync indicator/button 1730 is displaying an acquiring sync indicator icon 1810. In this example, the indicator icon 1810 is an animated icon depicting that the system is trying to acquire a synch between the content on the second screen device 520 and content on the first screen device 510.

FIG. 18*b* is a close up view 1800 of the header buttons 1720 wherein the sync indicator/button 1730 is displaying a timeline synced indicator icon 1820. In this example, the indicator icon 1820 depicts that the system has acquired a synch between the content on the second screen device 520 and content on the first screen device 510. In certain embodiments, the displayed icon 1820 may further indicate what synching mechanism was used. For example, icon 1822 can be used for BDLive synching, icon 1824 can be used for video metadata synching, and icon 1824 could be used for audio watermark synching. Other possible icons will be apparent to one skilled in the art given the benefit of this disclosure.

FIG. 18*c* is a close up view 1800 of the header buttons 1720 wherein the sync indicator/button 1730 is displaying a re-sync icon 1830. In this example, the indicator icon 1830 depicts that the content on the second screen device 520 and content on the first screen device 510 is not currently synchronized and selecting the button 1730 with attempt to re-synchronize the content on the second screen device 520 with the content on the first screen device 510. In certain embodiments, the system will attempt to re-synchronize after a certain period of inactivity by a user.

Figure 19:
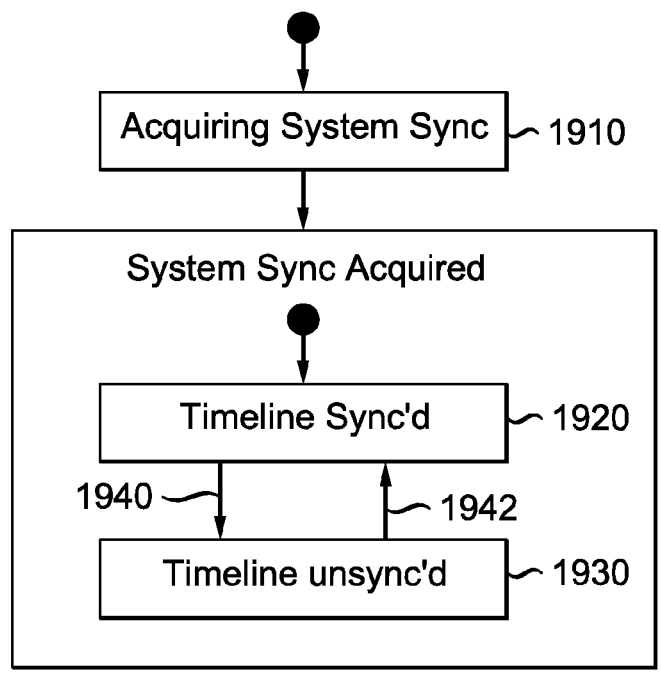
FIG. 19 is a diagram depicting the transition between states of sync in accordance with one embodiment.

FIG. 19 depicts a flow chart 1900 representing the various states of synching as indicated by the synch indicator/button 1730 in FIGS. 18*a-c*. First there is acquiring system sync 1910 which is indicated by icon 1810 in FIG. 18*a*. Then there is timeline synced 1920 which is indicated by icon 1820 or optionally icons 1822, 1824, and 1826. Finally there is timeline un-synced 1930 which is indicated by icon 1830 in FIG. 18*c*. Arrows 1940 and 1942 represent the transition between the synchronized 1920 and unsynchronized 1930 states, such as when the button 1730 displaying icon 1830 is selected to re-sync the timeline.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for informational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herewith represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although embodiments which incorporate the teachings of the present disclosure have been shown and described in detail herein, those skilled in the art can readily devise many other varied embodiments that still incorporate these teachings. Having described preferred embodiments for a method and system for providing media recommendations (which are intended to be illustrative and not limiting), it is noted that modifications and variations can be made by persons skilled in the art in light of the above teachings.

While the example set forth above has focused on an electronic device, it should be understood that the present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

What is claimed is:

1. A method of synching content on a second screen related to primary content being displayed on first screen, the method comprising:
   determining available synching mechanisms for synching content on the second screen to the content on the first screen;
   selecting a highest priority synching mechanism of the available synching mechanisms; and
   synching content on the second screen to the primary content displayed on the first screen using the selected highest priority synching mechanism, wherein available synching mechanisms comprises synching mechanisms selected from the group comprising: Blu-Ray Disc Live synching, Metadata synching, and audio watermark synching.

2. The method of claim 1, wherein the step of determining available synching mechanisms is performed continuously.

3. The method of claim 2, wherein the priority for the synching mechanisms is predetermined.

4. The method of claim 2, wherein the priority of the synching mechanism is user specified.

5. The method of claim 1, wherein the step of selecting a highest priority synching mechanism, comprises:
   determining the priority to be given each available synching mechanism; and
   selecting the synching mechanism with the highest of the determined priority of the available synching mechanisms.

6. The method of claim 1, wherein the priority of the available synching mechanism comprises: Blu-Ray Disc live, then Metadata Synching, then audio watermark synching.

7. The method of claim 1, further comprising the step of:
   displaying the status of the synch between content on the second and content on the first screen.

8. The method of claim 7, wherein the displayed status further indicates the synching mechanism used.

9. A second screen device comprising:
   a screen configured to display content;
   storage for storing data; and
   a processor configured to determine available synching mechanisms for synching content on the second screen device to content on a first screen device, select a highest priority synching mechanism of the available synching mechanisms, and synch content on the second screen to the content displayed on the first screen using the selected highest priority synching mechanism, wherein available synching mechanisms comprise synching mechanisms selected from the group comprising: Blu-Ray Disc Live synching, Metadata synching, and audio watermark synching.

10. The second screen device of claim 9, further comprising a wireless network interface for receiving synching data.

11. The second screen device of claim 9, further comprising a microphone for detecting synching information in the audio from a first screen display device.

12. The second screen device of claim 9, wherein the second screen device comprises a touch screen device.

13. The second screen device of claim 9, where the processor is further configured to indicate the status of the synch between the media of the content of the second screen and the content on the first screen.

14. The second screen device of claim 9, wherein the priority of the available synching mechanism comprises: Blu-Ray Disc live, then Metadata Synching, then audio watermark synching.

* * * * *